(12) United States Patent
Ortin Sebastian et al.

(10) Patent No.: US 11,953,476 B2
(45) Date of Patent: Apr. 9, 2024

(54) DEFLECTION-TYPE REFRACTOMETER WITH EXTENDED MEASUREMENT RANGE

(71) Applicant: POLYMER CHARACTERIZATION, S.A., Valencia (ES)

(72) Inventors: Alberto Ortin Sebastian, Valencia (ES); Benjamin Monrabal Bas, Valencia (ES)

(73) Assignee: POLYMER CHARACTERIZATION, S.A., Valencia (ES)

( * ) Notice: Subject to any disclaimer, the term of this patent is extended or adjusted under 35 U.S.C. 154(b) by 648 days.

(21) Appl. No.: 17/251,570

(22) PCT Filed: Nov. 19, 2018

(86) PCT No.: PCT/EP2018/081676
§ 371 (c)(1),
(2) Date: Dec. 11, 2020

(87) PCT Pub. No.: WO2020/078574
PCT Pub. Date: Apr. 23, 2020

(65) Prior Publication Data
US 2021/0262994 A1     Aug. 26, 2021

(30) Foreign Application Priority Data

Oct. 18, 2018   (ES) .................................. 201831017

(51) Int. Cl.
*G01N 30/74*     (2006.01)
*G01N 21/41*     (2006.01)
(Continued)

(52) U.S. Cl.
CPC ......... *G01N 30/74* (2013.01); *G01N 21/4133* (2013.01); *G01N 21/85* (2013.01);
(Continued)

(58) Field of Classification Search
CPC .... G01N 30/74; G01N 21/4133; G01N 21/85; G01N 30/16; G01N 2021/4153; G01N 2030/027; G01N 2201/021
See application file for complete search history.

(56) References Cited

U.S. PATENT DOCUMENTS 7,027,138 B2    4/2006  Larkin et al.
2005/0110982 A1*  5/2005  Larkin ............... G01N 21/4133
                                                356/128

(Continued)

FOREIGN PATENT DOCUMENTS

DE    102010004824 B4 *  3/2012  ............... B60N 2/06
JP       2011106944 A  *  6/2011
(Continued)

OTHER PUBLICATIONS

International Search Report and Written Opinion for Corresponding International Application No. PCT/EP2018/081676 (16 Pages) (dated May 29, 2019).

*Primary Examiner* — Steven L Yeninas
*Assistant Examiner* — Dilara Sultana
(74) *Attorney, Agent, or Firm* — Lucas & Mercanti, LLP

(57) ABSTRACT

A deflection-type refractometer with extended measurement range having a light source generating a beam of light; a measuring cell with a sample chamber receiving a sample liquid; an optical sensor mounted on a movable platform for detecting the deflected beam of light; a driving unit configured to move the platform; a distance measurement unit for monitoring the displacement of the platform; a control unit configured to calculate the deflection of the beam of light based on the displacement of the platform and an output signal of the optical sensor to obtain a refractive index measure of the sample liquid using the calculated deflection.

15 Claims, 24 Drawing Sheets

(51) Int. Cl.
*G01N 21/85* (2006.01)
*G01N 30/02* (2006.01)
*G01N 30/16* (2006.01)

(52) U.S. Cl.
CPC ..... *G01N 30/16* (2013.01); *G01N 2021/4153* (2013.01); *G01N 2030/027* (2013.01); *G01N 2201/021* (2013.01)

(56) References Cited

U.S. PATENT DOCUMENTS

| | | | |
|---|---|---|---|
| 2005/0168726 A1* | 8/2005 | Larkin | G01N 21/4133 356/135 |
| 2016/0062112 A1* | 3/2016 | Potsaid | G02B 26/06 356/497 |
| 2016/0163077 A1* | 6/2016 | Sawayanagi | G06T 11/206 345/440.1 |
| 2016/0238526 A1 | 8/2016 | Fadaei et al. | |

FOREIGN PATENT DOCUMENTS

| | | | | |
|---|---|---|---|---|
| JP | 3175079 U | 4/2012 | | |
| WO | 9004165 A1 | 4/1990 | | |
| WO | WO-9624045 A1 * | 8/1996 | ........... | G01N 21/251 |
| WO | 2006121195 A1 | 11/2006 | | |

* cited by examiner

DEFLECTION-TYPE REFRACTOMETER WITH EXTENDED MEASUREMENT RANGE

CROSS REFERENCE TO RELATED APPLICATION

This Application is a 371 of PCT/EP2018/081676 filed on Nov. 19, 2018 which, in turn, claimed the priority of Spanish Patent Application No. P201831017 filed on Oct. 18, 2018, both applications are incorporated herein by reference.

FIELD

The present disclosure is comprised in the field of refractometers and, more particularly, to deflection-type refractive index detectors, which obtain a differential refractive index by measuring the deflection of a beam of light at the interface of propagation media with different refractive index. The present invention can be used for liquid chromatography.

BACKGROUND

Refractometers for practical use in liquid chromatography are of deflection-type, using a split photodiode to detect changes in position of a deflected image. This configuration has proved to provide sufficient resolution and low noise as well as a continuous recording of refractive index of a liquid flowing through a measuring cell to be used as online detector in liquid chromatography applications. Alternative technologies (mainly based on detection of critical angle) have been developed into commercial products for detection of refractive index of bulk liquids, especially for the food industry, for instance to correlate with sugar content in drinks. However, those technologies provide much lower resolution than deflection-type detectors and do not allow for a continuous recording of refractive index overtime, so deflection remains the only practical alternative for detectors to be used for online monitoring of refractive index of a flowing stream of liquid.

Deflection-type detectors are always constructed as differential detectors in which a reference liquid is compared with a sample liquid. A deflection-type differential refractive index detector has a quadrangular prism flow cell constructed from two triangular prism chambers adjacent to each other, separated by a thin partition wall of parallel faces. A beam of light is made to traverse both chambers sequentially so that the beam experiments a deflection at the cell, exiting the cell at an angle different that the incidence angle. Typically, the incidence angle is 90° at the external face of the cell and the cell triangular prisms are arranged so the partition wall faces form an angle of 45° with the beam incidence angle. The deflection angle, that is the angle formed by the direction of the deflected beam compared to the direction of the incident beam, is proportional to the difference in refraction indexes of the sample liquid and the reference liquid. When the same liquid fills both cell chambers the deflection angle is zero, and the beam is not deflected. This is the so-called optical balance or optical zero.

A change in deflection angle is detected as the positional change of the light beam image at a fixed distance L from the flow cell by means of a split photodiode. An optical system comprising one or more lenses is typically used to generate a beam of light and form a beam image (e.g. a slit image) on the sensor plane. The longer the distance L the larger the positional change of the beam image for a given difference in refractive index ($\Delta n$) between sample and reference liquids.

The split photodiode is formed by two individual photodiodes, in general identical in shape size and sensitivity, whose signals are proportional to the amount of light received on their surfaces. The split photodiode is mechanically fixed in a position respective to the cell and beam of light such that when same liquid fills the reference and sample chambers the two individual signals are almost identical. An optical element (a glass plate, normally referred to as "zero glass") is typically inserted in the path of the light from the flow cell to the split photodiode (i.e. inserted in front of the position sensing detector) to allow for small lateral parallel movement of the beam to force the equality of the two signals in the optical balance situation. Means for turning the zero glass (thus varying the incidence angle on said element) are provided either manually operated or automatically operated through an electrical motor, for instance. Any mechanical or electrical disturbance on that zeroing system is transferred to the position of the light beam at the detector, being indistinguishable of a real signal, causing additional noise, drift or other undesired effects.

From there, any difference of refractive index ($\Delta n$) in the flow cell causes a deflection in the beam of light and the image on the split diode undergoes a positional change, causing an unbalance in the two photodiode signals, which is proportional to such positional change and, therefore, also proportional to the difference in refractive index ($\Delta n$).

Using this fixed position split diode system, the maximum deflection which can be measured is limited by the size of the beam of light image and the size of the individual photodiodes. When the beam image moves fully out of one of the diodes in direction of the other diode, no more positional change can be detected. This positional range limit is translated to angular units and so to differential refractive index ($\Delta n$) units by the distance L, which is also fixed in a given detector. The measurement range in existing deflection-type detectors is typically lower than $\pm 1.0 \cdot 10^{-3}$ differential refractive index units (DRIU).

A deflection-type detector with extended range is described in patent document U.S. Pat. No. 7,027,138-B2, the detector having an array of sensors instead of a split diode. In such system the positional range is increased because dimensions of an array are larger than that of a split diode, although the basic limitation in range remains, due to the detector physical size of the detecting element in a fixed position related to the cell.

The differential refractive index range might also be extended by reducing the distance L, so a given deflection angle due to a given differential refractive index ($\Delta n$) is translated in a smaller position change, which could be included within the split diode dimensions. However, this reduced distance L also lowers the sensitivity, which is not desirable. On the contrary, the distance L is typically selected as large as physically possible. Same reduction in positional change, which brings an extended range but also a reduction in sensitivity, can also be achieved by means of a measuring cell in which the partition forms a larger angle with the incidence beam, say 75° instead of the usual 45°. This strategy has been implemented in detectors for preparative scale in which sensitivity is not a concern but cannot be applied to analytical scale instrument in which sensitivity needs to be optimized. In either case the dynamic range, i.e., relation of the maximum measurable quantity and the lower detectable quantity, is not increased.

When the difference between the sample liquid refractive index ($n_2$) and the reference liquid refractive index ($n_1$) is larger than the limit imposed by the physical dimensions of the mechanical and optical parts, the optical balance must be regained by filling the reference cell with a liquid of closer refractive index to the sample liquid. This is very unpractical and totally discards this type of detectors for gradient applications when two different solvents flow through the sample chamber along the chromatographic run. Therefore, the limited range in differential refractive index ($\Delta n$) of the described prior art deflection-type refractometers is a serious shortcoming because it prevents the use of this type of detectors in gradient chromatography, which is the most extended and practical chromatographic mode. This is the main reason why refractometers, despite being universal detectors have only been used extensively in special niche application, such a size exclusion chromatography of polymers.

The same basic construction with a fixed position detector, causes that for previous art deflection-type refractive index detectors it is mandatory to use a dual-chamber (or dual-channel) flow cell having a reference liquid. The reference liquid determines the refractive index at which the optical balance or optical zero is established as well as the upper or lower limit in refractive index for the sample liquid before the detector is saturated. As a result, deflection-type detectors can only be used as differential refractive index detectors delivering refractive index data in relation of other liquid, while they do not provide directly the absolute refractive index of a liquid based only on the optical-mechanical construction details of the detector.

Besides, the requirement for a reference liquid chamber causes extended stabilization time, and is also a source of drifts, instabilities and adds considerable complexity to the system since means for purging the reference chamber with said reference liquid are necessary. In the standard adopted configuration the reference chamber is filled with a proper reference liquid (mobile phase in liquid chromatography) and then sealed by means of a valve. In this configuration the reference liquid is stagnant, which extends the time required for thermal stabilization upon a change in temperature of the cell or change in the flow rate of the sample liquid flowing through the sample chamber. In some cases, the reference liquid also suffers degradation due to elevated temperatures which in turn causes a drift in its refractive index translated into a deflection interfering with deflection due to the sample liquid. In order to achieve and maintain the optical balance, the refractive index of the flowing liquid must be the same as the stagnant liquid which is difficult or near impossible due to unavoidable pressure and thermal differences, even if both chambers are assembled in close contact and the pneumatic connections optimized to reduce the pressure difference.

Therefore, there is a need for a refractometer with an extensive measurement range in refractive index detection that allows to follow with high precision and resolution the changes in refractive index of a flowing liquid, such as those taken place in gradient liquid chromatography analysis, other related chromatographic or non-chromatographic analytical technique, and also following the progress in mixing or reaction processes.

SUMMARY

The present invention solves the above-mentioned problems by providing a very large measurement range refractometer of the deflection type that can be used as online detector in analyzers, for instance of liquid chromatography type.

The deflection-type refractometer with extended measurement range comprises:

Means for generating a beam of light, said means at least including a light source.

A measuring cell comprising a sample chamber for receiving a sample liquid, the measuring cell being arranged such that a beam of light from the light source impinges on the sample chamber and is deflected after traversing two non-parallel faces of the sample chamber.

An optical sensor mounted on a movable platform for detecting the deflected beam of light.

A driving unit configured to move the platform.

A distance measurement unit for monitoring the displacement of the platform.

A control unit comprising a data processing unit configured to calculate the deflection of the beam of light based on the displacement of the platform and an output signal of the optical sensor; and obtain a refractive index measure of the sample liquid using the calculated deflection.

In an embodiment, the measuring cell comprises a reference chamber for receiving a reference liquid. The measuring cell is arranged such that the beam of light is deflected after traversing two non-parallel faces of the reference chamber and sequentially traverses both the reference chamber and the sample chamber. The refractive index measure is the difference in refraction indexes between sample and reference liquids. The reference chamber may comprise inlet and outlet ports for receiving a flowing reference liquid.

In accordance with a further aspect of the present invention there is provided a gradient liquid chromatography system comprising a refractometer with reference and sample chambers, a pump for pumping a mobile phase comprising a mix of two or more solvents into the reference chamber of the refractometer, a chromatography column, the output of which is connected to the sample chamber of the refractometer, and an injector for dosing a solute into the chromatography column.

In accordance with yet a further aspect of the present invention there is provided a method for obtaining a refractive index measure of a sample liquid. The method comprises:

Generating a beam of light.

Receiving a sample liquid in a sample chamber of a measuring cell, the measuring cell being arranged such that the beam of light impinges on the sample chamber and is deflected after traversing two non-parallel faces of the sample chamber.

Moving a platform to detect the deflected beam of light (204) using an optical sensor mounted on the platform.

Monitoring the displacement of the platform.

Calculating the deflection of the beam of light based on the displacement of the platform and an output signal of the optical sensor.

Obtaining a refractive index measure of the sample liquid using the calculated deflection.

In accordance with another aspect of the present invention there is provided a gradient liquid chromatography method, comprising pumping a mobile phase comprising a mix of two or more solvents into the reference chamber of a refractometer; dosing a solute into a chromatography column, the output of which is connected to the sample chamber of the refractometer; obtaining a refractive index measure of the sample liquid according to the method previously described.

The present invention achieves a very large detection range by placing the position sensing detector on a movable element, instead of a fixed placement at the optical zero, and therefore the sensitivity to refractive index changes is preserved along the measurement range. The position sensing detector may be placed on top of a linearly moving platform whose movement is provided by a linear piezo motor stage or other alternative driving means (e.g. electrical motor, step-motor). The movable element may have a rotation movement (a rotating element), a translation movement or a combination thereof.

In this way the limitation on positional range and differential refractive index (Δn) range, due to the photodiode size is overcome, by moving the platform in the direction of displacement of the light beam image (i.e. the deflected beam of light).

The refractometer apparatus comprises a source of light, a measuring cell containing solvent and sample in time sequence and a position sensing detector (split photodiode or in general segmented photodiode, lateral effect photodiode, array of sensors or alternative light position sensitive device), or in general an optical sensor, mounted on the moving platform so that it can follow the position of the beam image (or deflected beam of light) when the deflection at the cell is large. When the mechanical dimensions and relative position of the cell and photodiode are accurately known, the absolute refractive index of the fluid in the cell can be calculated, in addition to the differential refractive index of a sample flowing through the cell with respect to the solvent.

Unlike the refractometers known in the prior art (where an optical element, such as a zero glass, is moved or rotated at a setup step previous to the refractive measuring process with the aim to establish an optical balance), in a preferred embodiment of the present invention the position sensing detector is continuously moved to track the deflected beam of light during the whole measuring process of the refractive index. Therefore, the refractometer is continuously tracking and estimating the refractive index (and variations thereof) during the measuring process.

The moving platform position is precisely and accurately controlled by the detector electronics system, so that the accurate position of the beam image can be obtained by combination of the split photodiode signals and position of the platform, or by the position of the platform if the beam is kept at the center of the split photodiode. A distance measurement unit monitors the displacement of the platform with high resolution (submicron, nanometer) and accuracy. The distance measurement unit may be implemented as part of the driving unit (e.g. an optical encoder or detector based on laser interferometry) or an external sensor monitoring the platform displacement.

The high resolution and precision of the moving platform allow reaching the required resolution and noise required for the application of measuring refractive index, and refractive index differences over time in the context of a chromatographic system ($10^{-8}$ and better in RIU or DRIU units). At the same time the range in distance is also large enough to cover the deflection angular variation in the absolute refractive index range, at least 15 millimeters to 50 millimeters for most practical applications.

Alternative means for detecting the deflected light, and driving the movable element tracking its position continuously can also be conceived without using a position sensing detector, but a light power sensor. Both position sensing detector and light power sensor terms are used here to name different types of the general class of optical sensors, which are devices that generate an electrical signal in response to some property of a light radiation. In the case of the position sensing detectors the electrical signal is related to the position of the light relative to the sensing area, whereas in the case of light power sensors the electrical signal is related (proportional) to the intensity or power of radiation received on the sensing area.

The position of a beam with a proper size and/or spatial power profile can be tracked by using a light power sensor whose output is proportional to the intensity or power of received radiation. In this case the movement of the platform may be controlled by an algorithm which keeps the signal at the maximum level, achieved when the light beam is centered on the sensor. A fast-enough scanning system may also serve the same purpose, without the need of a position sensing detector, but some other type of optical sensor. When those beam tracking systems which do not include a position sensing detector are used, the position of the beam image can be obtained by the position of the platform.

The refractometer of the present invention can be used as a batch detector in which the sample chamber of the cell is kept filled with the liquid whose refractive index is to be measured with no flow during the measuring time (i.e. static measurement), or as an on-line analyzer in which a continuous flow of liquid is maintained by external means (i.e. a pump) through the sample chamber while the refractive index of the flowing liquid is measured over time (i.e. dynamic measurement). In the batch mode, a single reading is eventually obtained from the detector representing the refractive index of the liquid filling statically the sample chamber, while in the online analyzer mode a series of continuous readings of the refractive index over time is produced by the detector. The online analyzer mode is used when the detector is coupled to liquid chromatography or related techniques in either isocratic (mobile phase composition is constant over time) or gradient (mobile phase composition varies over time) methods.

When used as batch detector, the moving platform allows performing a scan along the movement dimension in order to search the beam position. In an embodiment, this can be achieved by monitoring the signals generated from the split diode determining the position of the moving platform at which the sum of two signals from the individual photodiodes is maximum. The moving platform is stopped at that point and its position recorded. The difference between the signals from the two photodiodes is an accurate measure of the relative position of the image of the beam of light with respect to the split photodiode. This relative position is combined with the platform position to determine the absolute position of the light beam (with respect to the cell) and so calculate the deflection angle and from it the refractive index of the liquid in the sample chamber.

Different operation modes which are feasible when the detector is used as online analyzer producing a continuous refractive index signal over time. Some of them, with increasing complexity, are described next, although alternative or combined modes may also be possible.

In the simplest operation mode, the platform is only positioned initially so that the split diode attached to it generates balanced input signals, that is, the beam is centered on its surface. From that point the detector is used as a conventional deflection-type detector and the beam position deflection is obtained as proportional to the difference in signals from the two photodiodes, being in turn proportional to the refractive index change over time. In this mode the differential range is still limited by the image and sensor physical dimensions, although contrary to conventional detectors, that differential range does not need to be centered around the optical zero. This allows performing analysis with different solvents, having different refractive index, without the need for purging the reference chamber in the cell with the solvent in use, increasing the efficiency by eliminating the time for purge procedure as well as re-stabilization time after purge. It also allows using a measuring cell with only one chamber, without a reference chamber with the advantages that this approach entails.

In another operation mode, suitable for a well-defined profile of refractive index variation over time (linear change in mobile phase/background refractive index in a solvent gradient analysis), the motor moving the platform can follow a preset movement pattern, continuous movement between two given positions at a pre-set constant speed, or some arbitrary movement at time varying speed. The initial and final positions as well as the speed of movement (in general any movement profile) need to be pre-recorded in a previous learning step, or otherwise calculated from the expected refractive index over time variations. The movement ensures that the image of the beam does not reach the limits of the photodiode when deflected at varying angles over time, and the position of the beam can be continuously calculated from the known position of the platform combined with the relative position of the beam to the split diode, derived from the individual photodiode signals.

In yet another operation mode a simple controller is implemented which monitors the individual signals of the photodiodes A and B in order to move the platform so that the beam image does not move beyond the physical limits of the split photodiode.

In a general operation mode, having arbitrary changes of refractive index over time, the system can be used in a closed loop operation as a nulling device, which is the preferred mode of the present invention. The moving platform is continuously moved to ensure the split diode signal is always balanced. This is achieved by implementing a servo control algorithm (e.g. PID) in which the error signal is the difference between both photodiode signals, and the applied action is the incremental displacement of the moving platform (displacement in one direction or the contrary, from the current position). The signals from the two photodiodes (A, B) are acquired with proper electronics and the normalized difference defined as $(A-B)/(A+B)$ can be used as an "error" signal for the PID algorithm. The output of the PID algorithm, that is the action (u), is the incremental movement required to cancel out the error signal. This action is calculated by a microcontroller or computer running the firmware or software implementing the PID equations using the normalized difference signal obtained in one cycle to calculate the output (u) to be set in the next cycle. The cycle time is set as short as possible in order to improve the accuracy of the tracking, minimizing the error signal at all times, at least 10 times per second, or times per second. The parameters for the PID controller are optimized to prevent ringing, undesired oscillations or increased tracking noise, while keeping a fast-enough response to track even the most rapid movements in the beam position. For this purpose, some experiments to extract the dynamic response of the system can be performed. One of such possible experiments involve performing a forced step movement of the motor (apply an arbitrary action) and reading the error signal over time. The delay from action to error signal change, the final error signal compared to the magnitude of the action applied and the time constant of the error stabilization, among other parameters can be used to characterize the dynamic response of a system. With this information, optimized parameters for the controller are computed.

The ability to detect the position of the light beam image after deflection at the cell in a broad range removes the need to perform an optical zero to bring the light beam image to a set position at the detector plane. This way, any additional optical components (e.g. zero glass plate) or opto-mechanical mechanisms (for automated or manual rotation of the zero glass plate) present in previous detectors to perform an optical zeroing (i.e. adjust the beam image position accurately at the split photodiode center when the condition of $\Delta n=0$ is set, by having both cell chambers filled with same liquid, and same n) are not necessary, thus simplifying the hardware requirements and eliminating sources of instabilities or drifts as well as hardware complexity.

Most important, detectors in previous art require a dual chamber cell to keep the beam light image at the optical zero on the split diode fixed position, whereas the present device can work with a single chamber cell and therefore a reference chamber is no longer required. This difference helps overcome most of the stability problems with existing technology base on dual-chamber cell concept. The measuring cell with a single chamber and chromatography inlet and outlet ports is also able to sustain high pressure operation making it useful in serial combination with other detectors, such as a viscometer, or low bore tubing setups, such as UPLC systems.

Therefore, the present invention provides a refractometer especially useful in gradient liquid chromatography applications, with a highly extended measurement range of at least $\pm 1.0 \cdot 10^{-1}$ RIU, highly precise (a precision better than $10^{-8}$ RIU) and an increased dynamic range. The refractometer can follow changes in refractive index orders of magnitude larger than conventional differential refractometers in prior art. The refractometer can measure absolute refractive index since it does not require using a reference chamber filled with reference liquid. Besides, the refractometer herein described is not prone to the difficulties or failures due to an optical zeroing element (zero glass), since this optical element is not required. In addition, when used with a single chamber cell, all the drawbacks associated with the reference chamber are removed: purge circuit hardware requirements as well as drifts, increased stabilization time or additional noise caused by the reference chamber liquid.

BRIEF DESCRIPTION OF THE DRAWINGS

A series of drawings which aid in better understanding the invention and which are expressly related with an embodiment of said invention, presented as a non-limiting example thereof, are very briefly described below.

DETAILED DESCRIPTION

The present invention refers to a deflection-type refractive index detector with high precision and a very large measurement range, that can be used for liquid chromatography.

Figure 1:
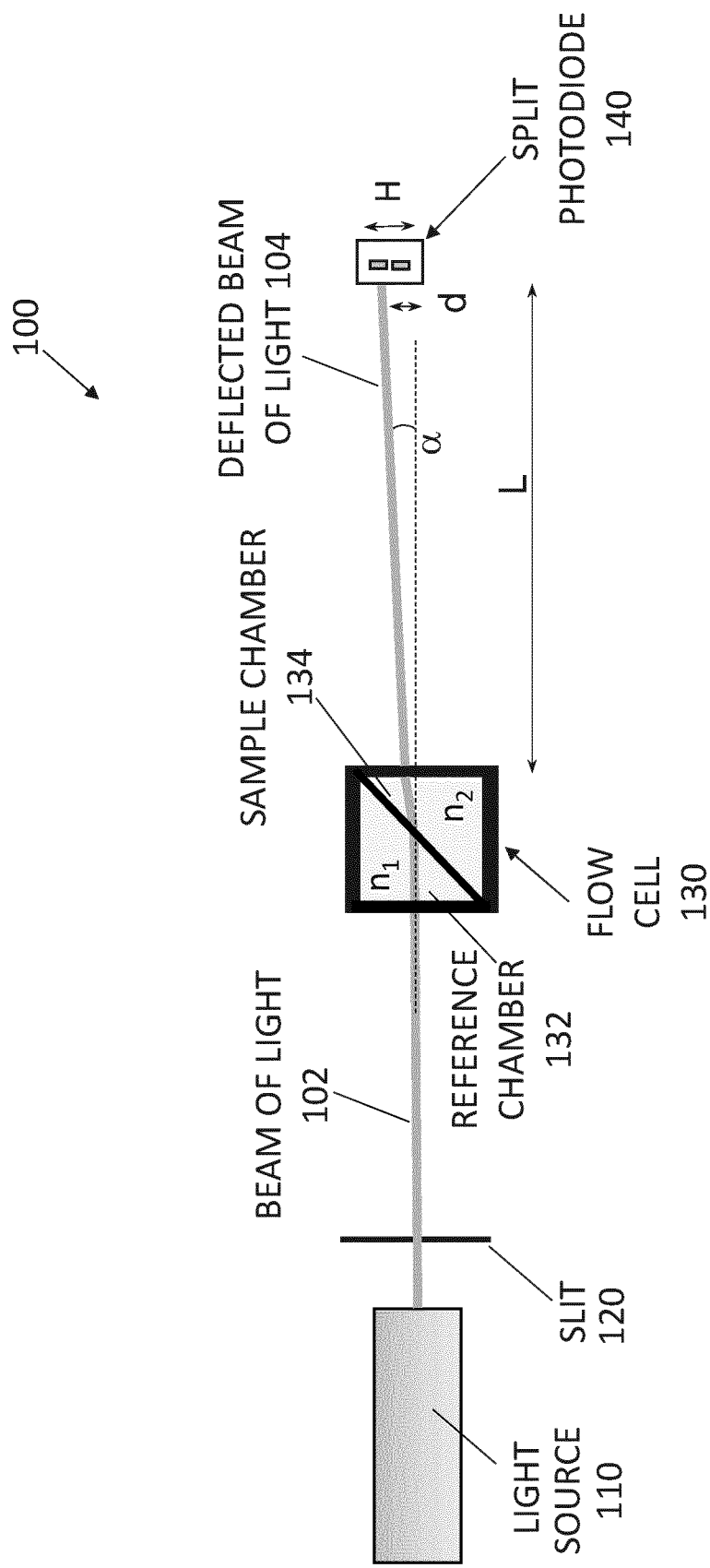
FIG. 1 shows a deflection-type refractometer according to the prior art.

FIG. 1 depicts a deflection-type refractometer 100 according to the prior art, in which a beam of light 102 is generated from a light source 110 and a slit 120. The beam of light 102 impinges a dual-chamber flow cell 130 comprising two triangular prisms, a reference chamber 132 and a sample chamber 134, having inlet and outlet ports (not depicted in the figure) and respectively filled with reference liquid and flowing sample liquid with different refractive indexes n1 and n2. When the beam of light passes through the flow cell 130, it is deflected a certain angle $\alpha$ according to the differential refractive index ($\Delta n=n2-n1$) of both liquids.

The deflected beam of light 104 is detected by a split photodiode 140 placed at a fixed distance L from the flow cell 130. In particular, the displacement of the beam d is measured by the split photodiode 140, the deflection angle $\alpha$ is then obtained ($\alpha=\tan^{-1}(d/L)$) and the refractive index difference ($n_2-n_1$) is finally computed. If the difference is such that the displacement of the beam d at the detector plane is larger than the size H of the detecting device in the same dimension, the system is out of range. Typically, the maximum range in differential refractive units is around $\pm 0.6 \cdot 10^{-3}$ DRIU (differential refractive index units).

In deflection-type refractive index detectors a beam of light is directed at a certain angle, typically 45° to the surface of a glass in contact with the sample liquid to be monitored.

According to Snell's law, the angle of the light beam after traversing the glass containing the sample liquid is different to the incidence angle and it is related to the refractive index of the media in contact at that surface, that is, the sample liquid to be monitored and the glass material of the container.

According to the prior art, the refractometers applied to liquid chromatography employ a two-chamber flow cell, with one of the chambers filled with the sample liquid (solvent plus solute), and the second chamber filled with a reference liquid (pure solvent), so there are two surfaces at which refraction takes place. If same liquid (pure solvent) is present in both chambers the angle of the beam of light after the dual-chamber cell is not modified, while a small change in refractive index of the liquid in one of the chambers due to the presence of some solute produces a small change in the angle of the beam of light after the flow cell. This change in the angle is detected at a certain distance L as a change in the position of the beam in the plane of a position sensing detector (i.e. displacement d). The displacement of the beam d, measured by split diode 140, is approximately proportional to the refractive index difference $n_2-n_1$, which in turn is proportional to the concentration of solute in the solvent of the sample liquid. The refractometers of the prior art normally include also a zero glass deflector (not shown in FIG. 1) to accurately adjust the deflected beam of light at the center of the split photodiode when the condition of $\Delta n=0$ is set.

This system works only for small differences in refractive index, which generate small angular variations. However, in gradient liquid chromatography, when two different solvents (of different polarity) are combined to form the mobile phase in time-varying proportion, the change in refractive index of the mobile phase is orders of magnitude larger that the differences caused by a solute in a solvent, so the variation of the deflection angle along the gradient analysis is much larger than the possible measurement range (limited by the size H of the detecting device). These refractometers are therefore not useful when used in gradient liquid chromatography analysis.

The refractometer of the present invention is especially useful for gradient liquid chromatography since it possesses a large measurement range in refractive index units (RIU), which can follow the continuous change in refractive index when the mobile phase composition is varied from one solvent to the other. In the present invention the position sensing detector (split diode) is placed on a moving platform, so that it is able to measure very large displacement values d, in the order of centimeters, which translate at least in tenths of RIU units of refractive index change.

Figure 2A:
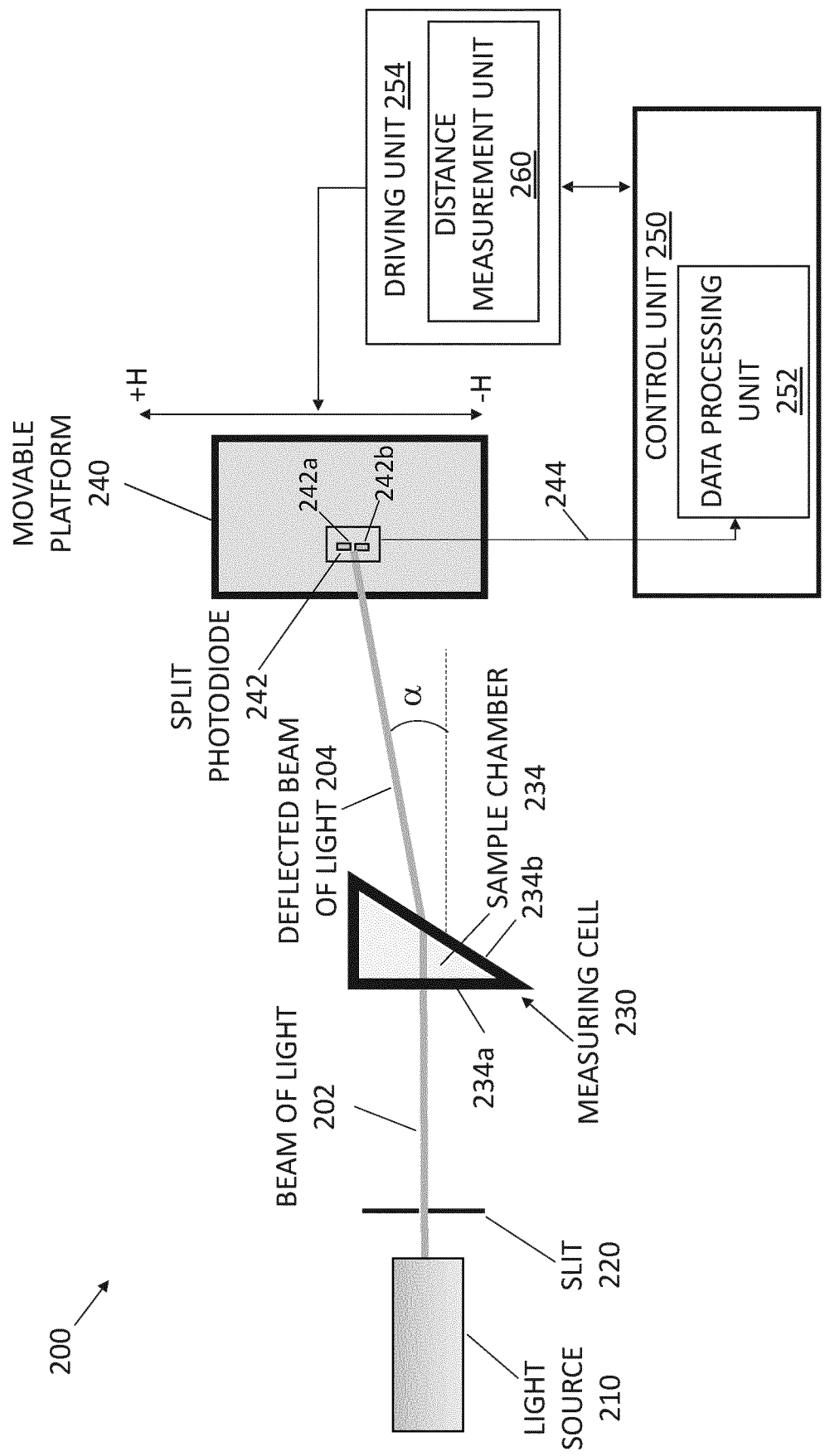
FIGS. 2A and 2B depicts two embodiments of a deflection-type refractometer with a single-chamber flow cell according to the present invention.

FIG. 2A represents a deflection-type refractometer 200 according to an embodiment of the present invention. The refractometer 200 comprises means for generating a beam of light 202 that will be deflected by the sample liquid and impinge on the plane of the position sensing detector, generating a light beam image on that plane, which will move according to the deflection experienced by said light beam.

The beam of light 202 may be produced, for instance, using a light source 210, collimated such as a laser diode or non-collimated such as an LED or lamp with a collimating lens (not shown in the figure) and a restrictive light slit 220. Additional optical elements (e.g. lenses, slits, optical apertures) may be employed for the generation of the beam of light or beam image.

A measuring cell 230 comprises a sample chamber 234 containing a sample liquid. Two faces (front face 234a and rear face 234b) of the sample chamber 234, which are not parallel to each other, are traversed by the light beam so that when the beam of light 202 passes through the sample chamber 234 it is deflected by the sample liquid a certain angle. Those two faces need to be made of a material transparent to the wavelength of the light used, such as glass, fused silica, quartz, sapphire, for visible light, and also be polished to prevent diffuse reflection or scattering of the beam of light. The rest of the cell walls may be made from the same material or different as they do not interact with the light rays of interest. The deflected beam of light 204 is detected by a position sensing detector mounted on a movable platform 240. The position sensing detector is preferably implemented as a split photodiode 242 formed by two individual photodiodes (242a, 242b) or, alternatively, as a lateral effect photodiode of adequate sensitivity or other known position sensitive device such as a photodiode array.

Figure 2B:
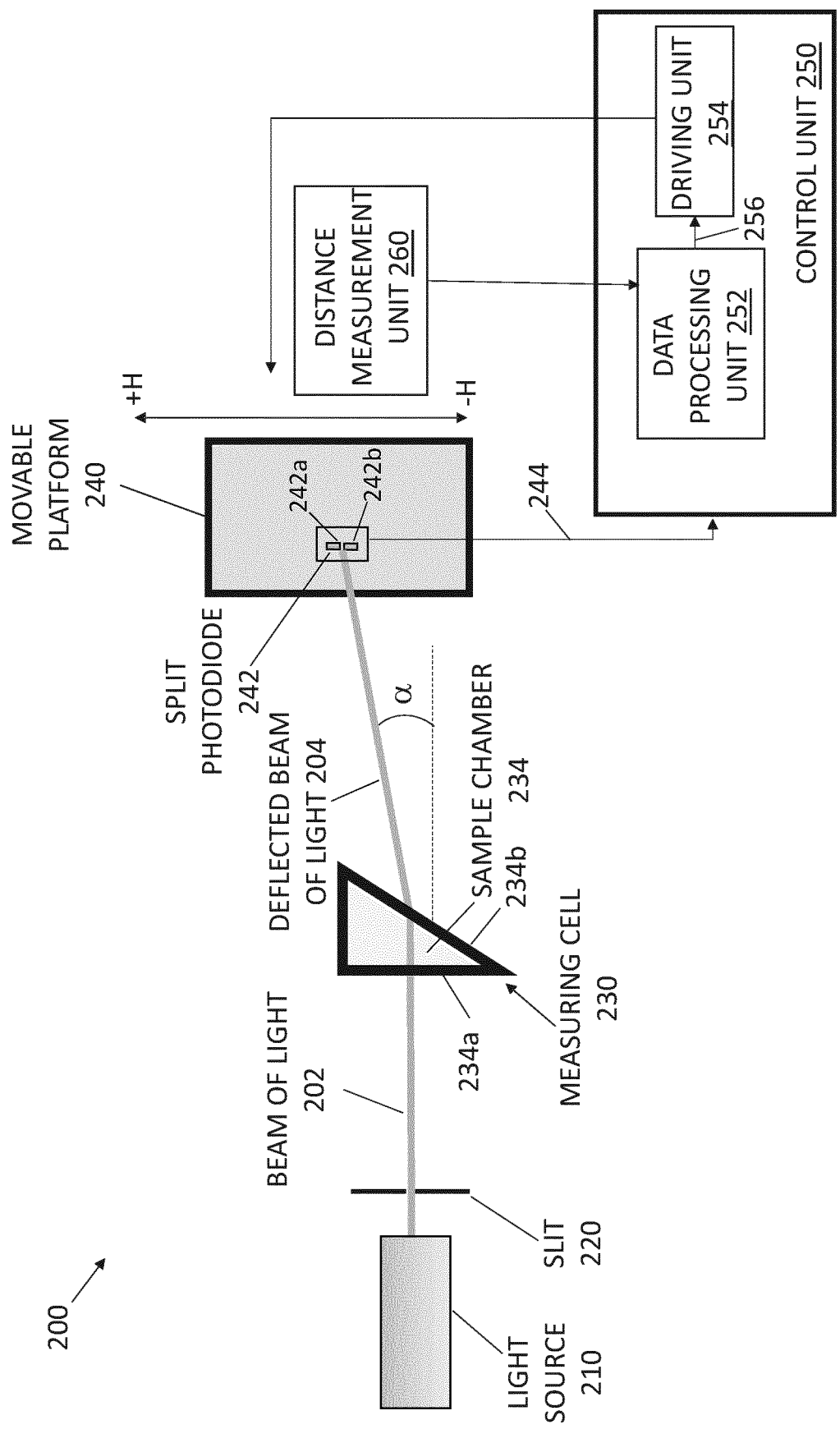

The refractometer also comprises a driving unit 254 configured to move the platform, a distance measurement unit 260 configured to measure the displacement of the platform 240 and a control unit 250 that receives the output signal 244 from the position sensing detector (e.g. the signal coming from each individual photodiode 242a and 242b). The distance measurement unit 260 detects each minimal displacement of the platform 240 with high resolution, preferably in the order of submicrons or nanometers (any known detector may be used to that end). The distance measurement unit 260 may be an element integral to the driving unit 254 (e.g. optical encoder of a motor), as in the example of FIG. 2A, or an element external to the driving unit 254, as shown in the embodiment of FIG. 2B. The control unit 250 comprises a data processing unit 252, implemented for instance as a microcontroller or a computer, that calculates the deflection of the beam of light (deflection angle α caused by the measuring cell 230) based on the displacement of the platform 240 and the output signal 244 of the position sensing detector, thereby obtaining a refractive index measure of the sample liquid inside the sample chamber 234 using the calculated deflection. The control unit 250 may obtain the displacement of the platform 240, for instance, directly from the driving unit 254 (e.g. using an encoder thereof) or using an external sensor (not shown in the figure) configured to monitor the positioning of the platform 240. In either case the resolution in the displacement is preferably in the order of nanometers, in order to provide the required resolution in refractive index units.

In the embodiment shown in FIG. 2A, the driving unit 254 moves the platform 240 linearly along an axis H perpendicular to the beam of light 202 (in the example, the beam of light 202 is a horizontal line and the axis H is a vertical line). Instead of a linear movement, the driving unit 254 may move the platform 240 following a known trajectory, for instance an angular movement, such that the position of the platform 240 can be determined at each instant.

The driving unit 254 may be an entity external to the control unit 250, as depicted in FIG. 2A. Alternatively, as shown in the embodiment of FIG. 2B, the driving unit 254 may be part of the control unit 250.

In an embodiment, the driving unit 254 independently moves the platform according to a predetermined movement pattern, for instance a continuous movement between two pre-defined positions at a constant speed, or some arbitrary movement at time varying speed. The driving unit 254 may instead be controlled by an activation instruction 256 sent by the data processing unit 252 of the control unit 250.

Figure 2C:
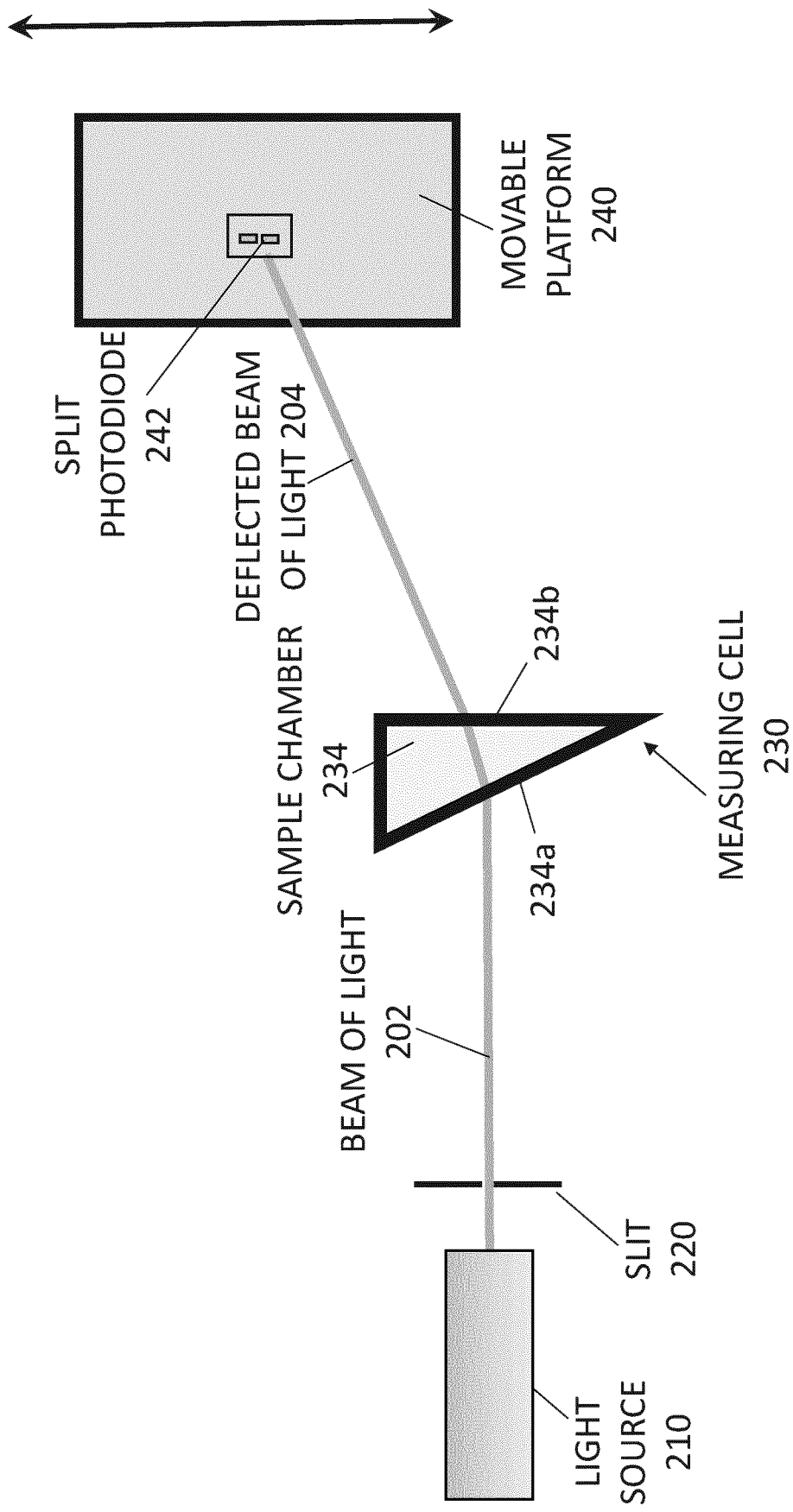
FIG. 2C depicts a simplified view of another embodiment.
Figure 3:
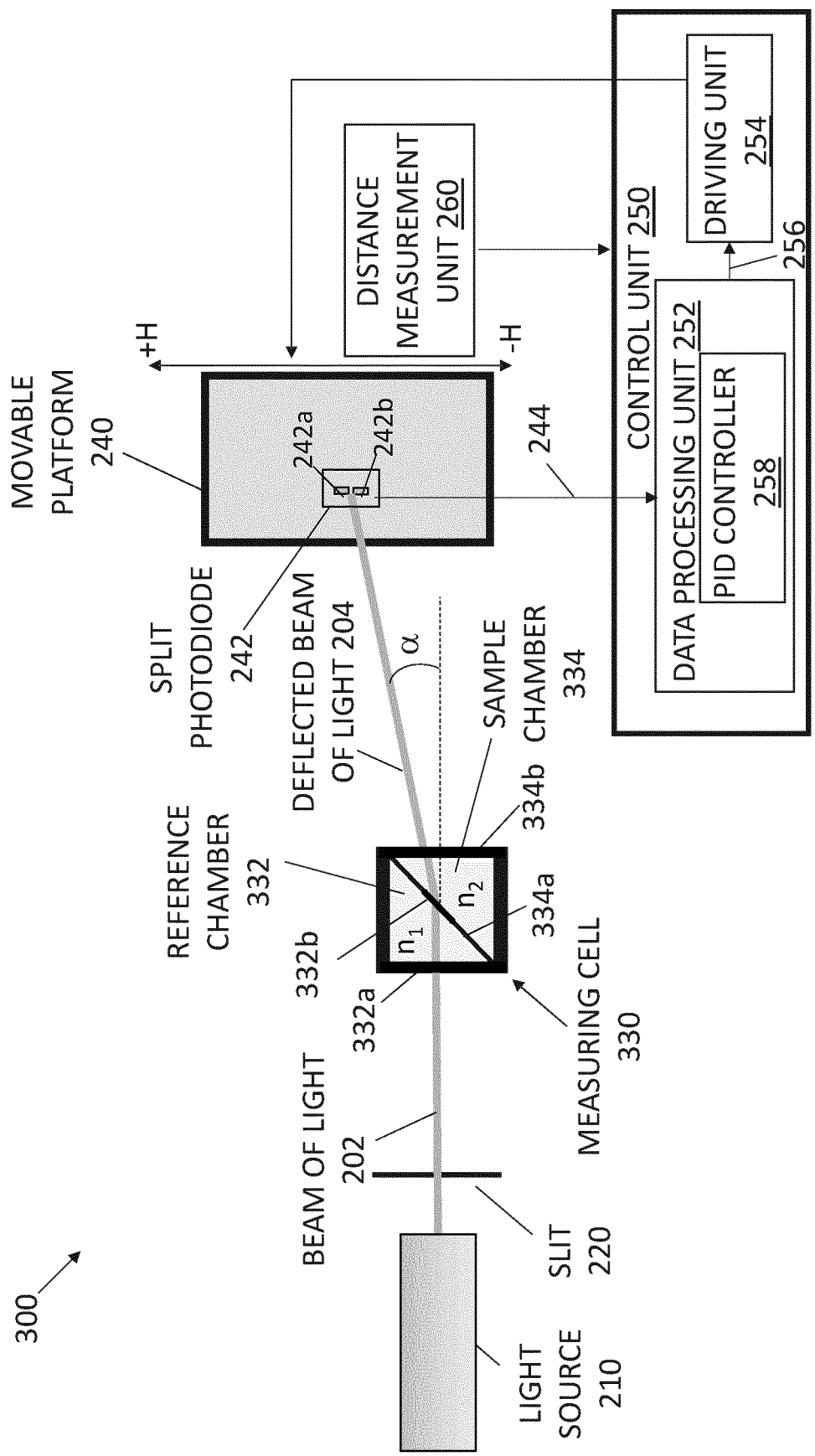
FIG. 3 depicts another embodiment of the refractometer, in this case with a double-chamber flow cell.

In the embodiment of FIGS. 2A and 2B, the measuring cell 230 is a single-chamber cell, in particular a triangular prism with a single chamber (the sample chamber 234), wherein the triangular prism is arranged such that the incidence angle of the beam of light 202 is 90° at an external, front face of the prism. In another embodiment depicted in FIG. 2C (not showing the control unit 250 and driving unit 254) a single-chamber measuring cell 230 is arranged in a position such that the incidence angle of the beam of light 202 is not normal to the first surface (front face 234a), and therefore there are two surfaces (front face 234a and rear face 234b) at which the beam is deflected when traversing the measuring cell 230. FIG. 3 depicts a refractometer 300 according to yet another embodiment, in which the measuring cell 330 is not a single-chamber cell, but a dual-chamber cell. In this case the measuring cell 330 comprises a sample chamber 334 for receiving a sample liquid and also a reference chamber 332 for receiving a reference liquid. The measuring cell is arranged such that the beam of light is deflected after traversing two non-parallel faces (front face 332a and rear face 332b) of the reference chamber 332 and then two non-parallel faces (front face 334a and rear face 334b) of the sample chamber 334. The refractive index computed by the data processing unit 252 is the difference in refraction indexes (Δn) between the sample liquid (refraction index n2) and the reference liquid (refraction index n1).

Figure 4A:
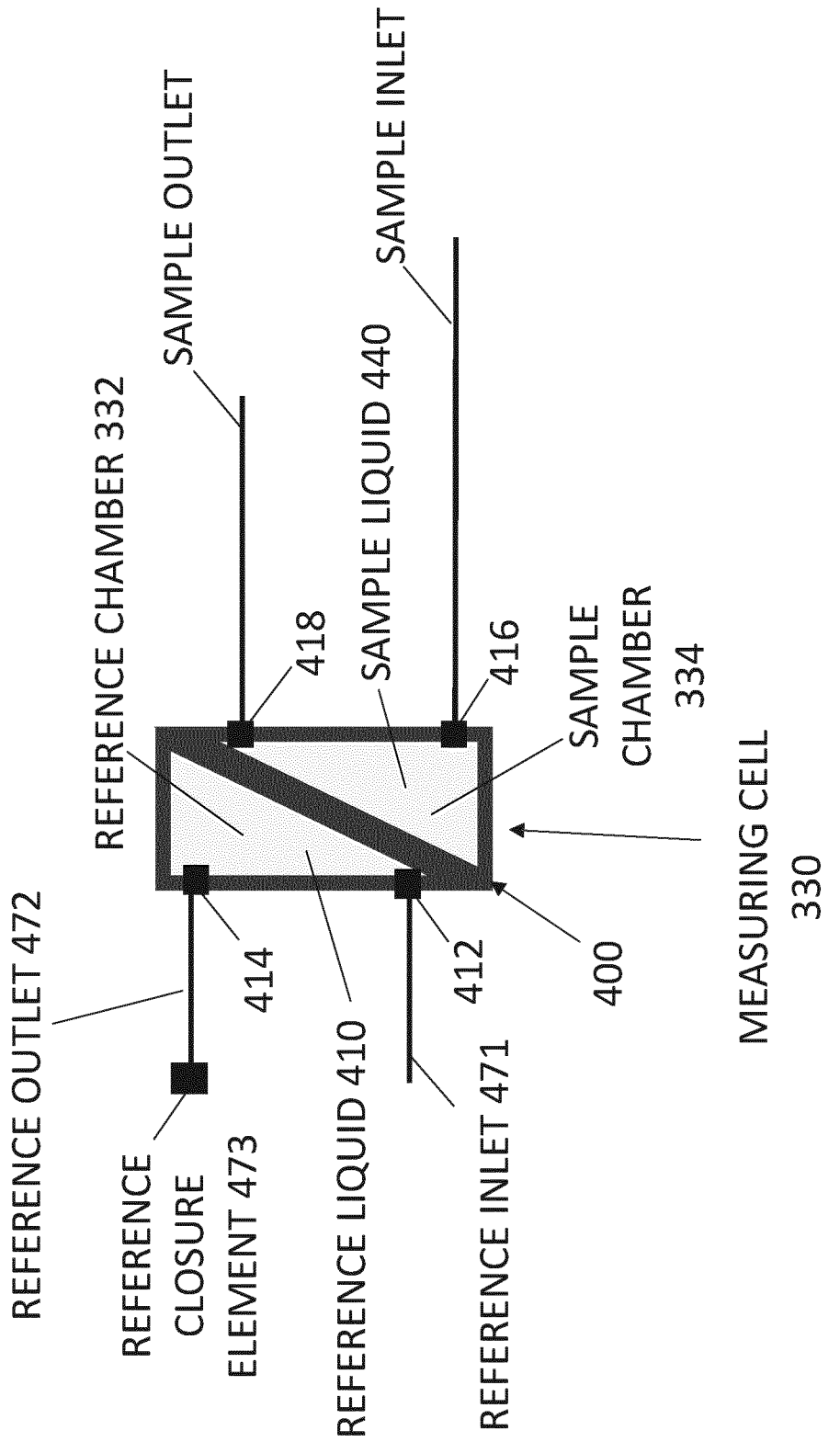
FIG. 4 depicts the use of a double-chamber cell in batch mode (FIG. 4A), single-chamber flow cell with continuous flow (FIG. 4B), double-chamber flow cell with static reference chamber and continuous flow though the sample chamber (FIG. 4C) and double-chamber flow cell with continuous flow through both chambers connected in series, before and after injector and column (FIG. 4D).

FIG. 4A illustrates the operation of the measuring cell in a refractometer as a batch detector. The reference chamber of the cell is filled with a reference liquid whose refractive index is known, and then the reference chamber is sealed. The sample chamber is filled with a sample liquid whose refractive index is unknown (alternatively, the sample liquid may be flowing through the sample chamber). In that situation the differential refractive index of the sample liquid with respect to the reference liquid is measured by the detector. The reference chamber can also be omitted in the refractometer of the present invention (not shown in FIG. 4A); in that case, the absolute refractive index of the sample liquid is measured.

Figure 4B:
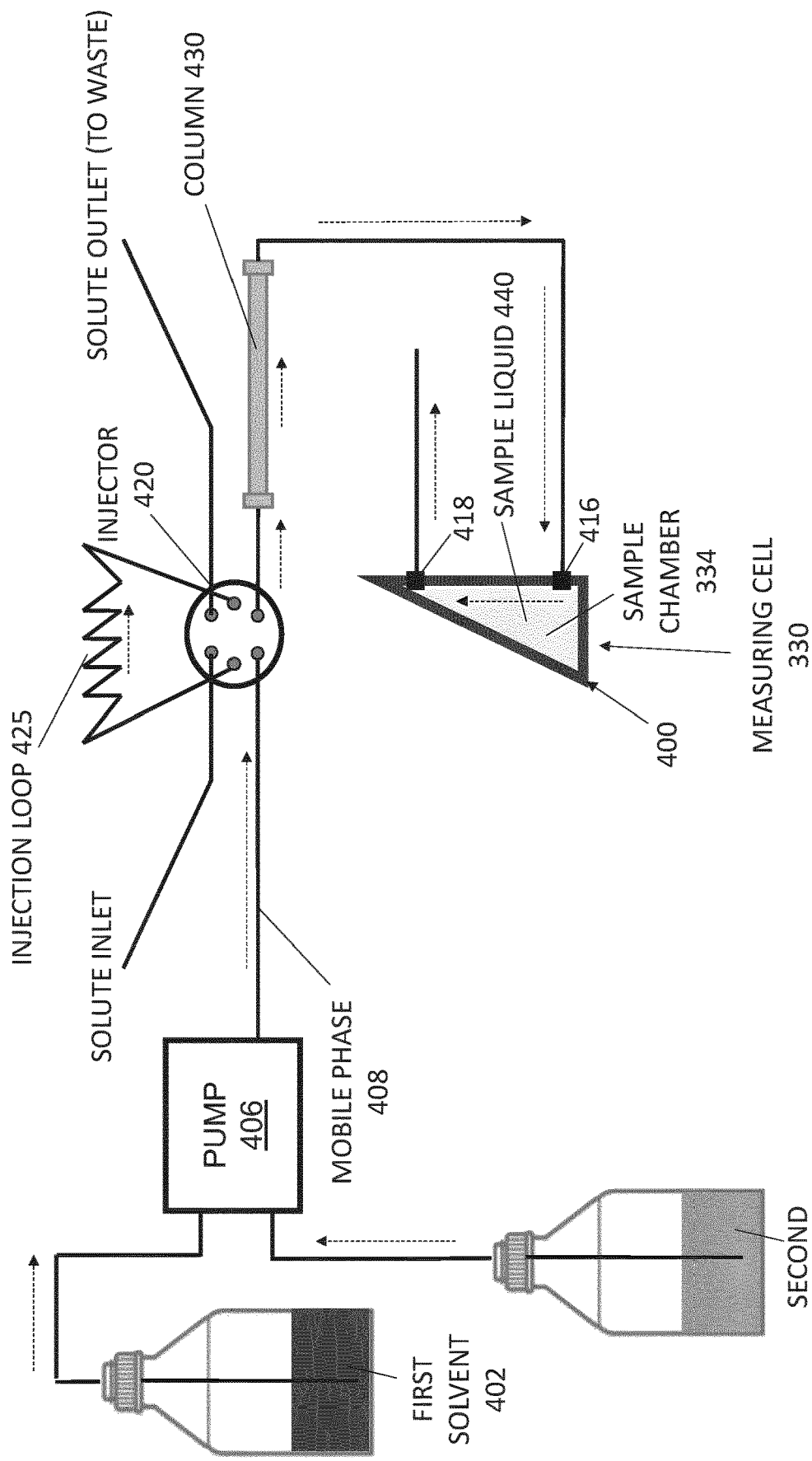
Figure 4C:
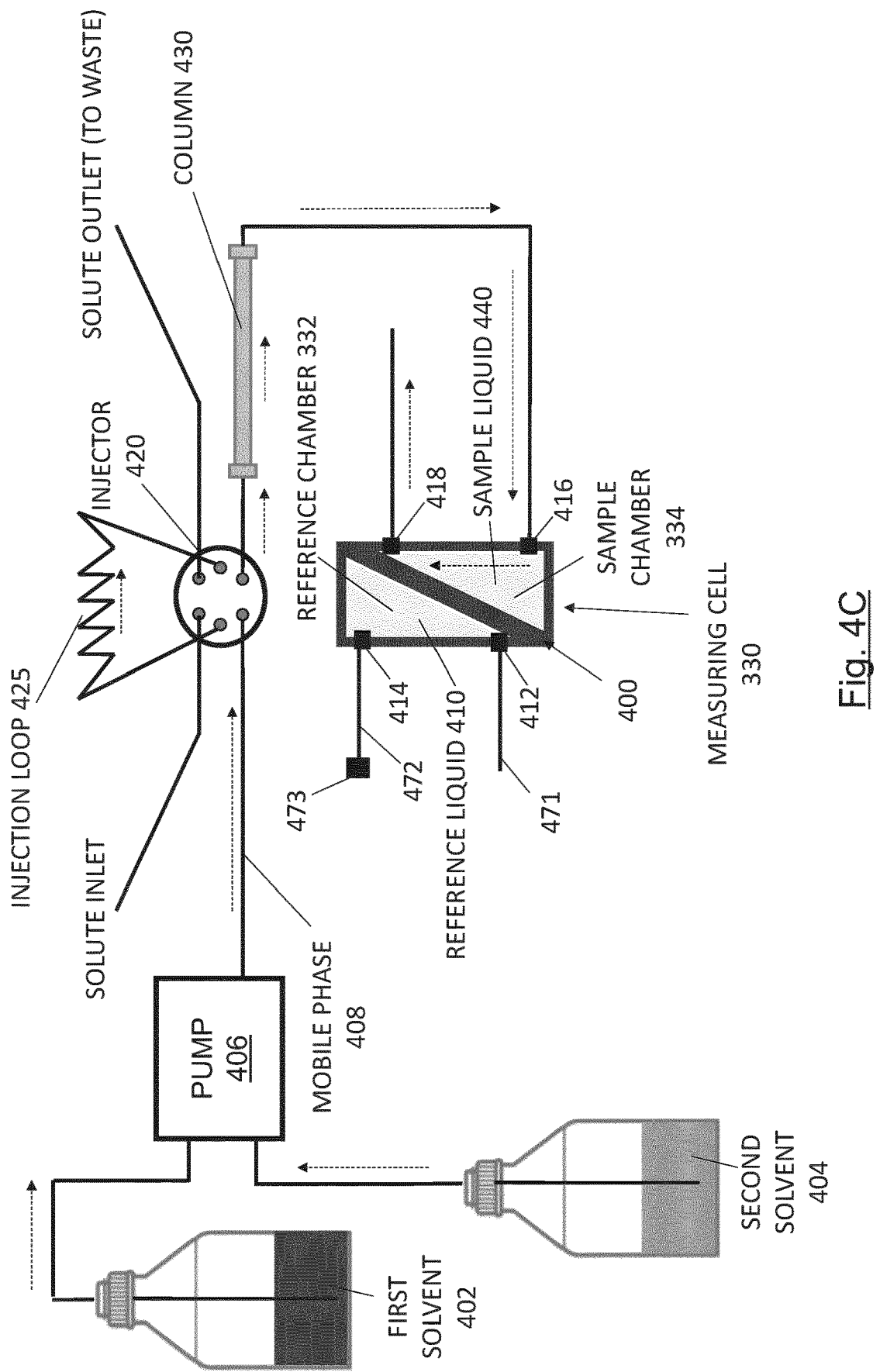
Figure 4D:
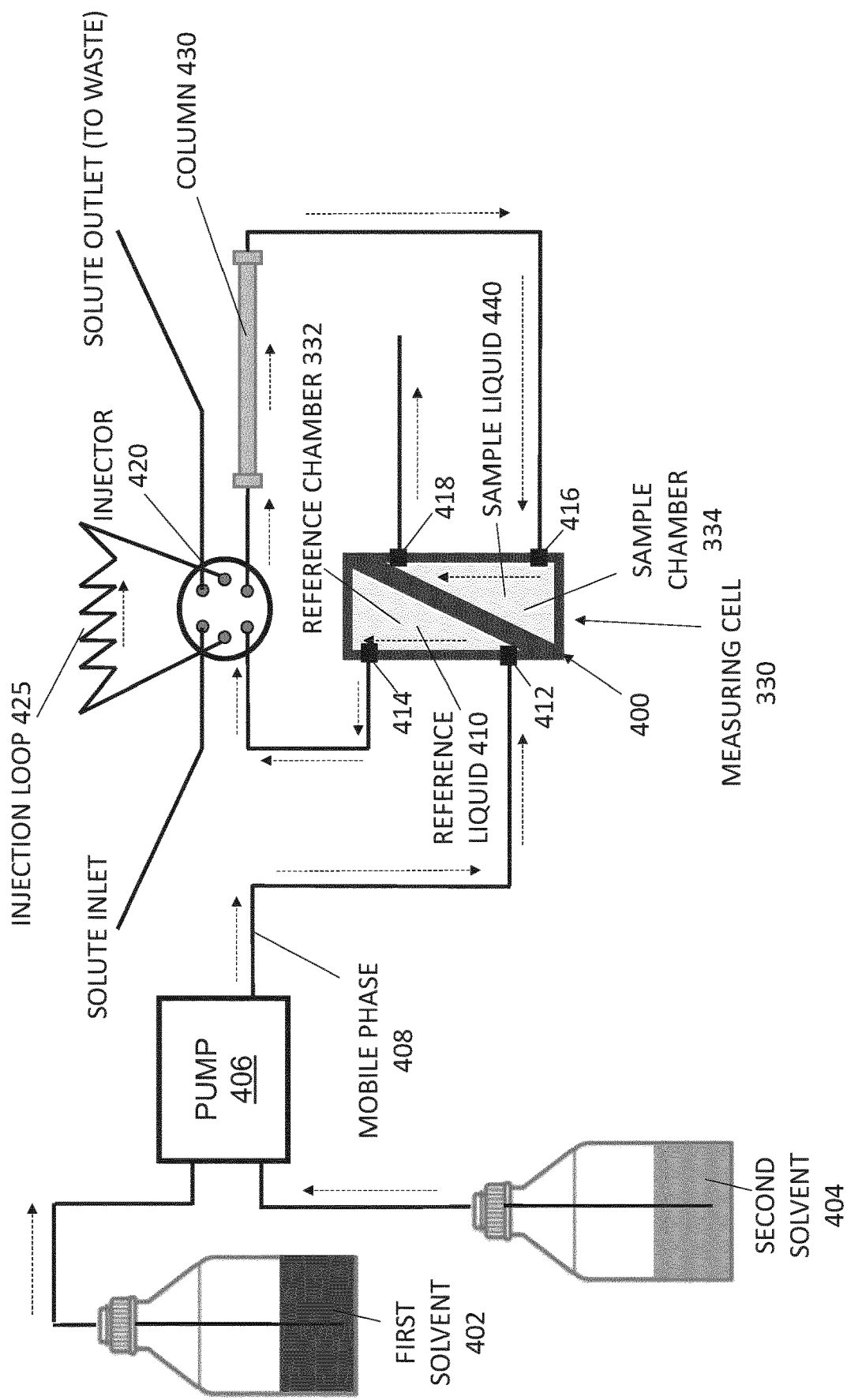

Possible implementations for operation of the refractometer of the present invention as online analyzer in a chromatograph (or similar system) is illustrated in FIGS. 4B to 4D. FIG. 4B depicts a chromatograph using a single-chamber flow cell refractometer with continuous flow, FIG. 4C depicts a double-chamber flow cell with static reference chamber and continuous flow though the sample chamber, and FIG. 4D depicts a double-chamber flow cell with continuous flow through both chambers connected in series.

As depicted in FIG. 4C, the reference side of the cell may be filled with a reference fluid, using the reference inlet (471) and reference outlet (472) and then sealed by means of the reference closure element (473). This way the reference fluid is kept static along the use of the detector, while a continuous flow of sample liquid is kept through the sample chamber 334. The difference in refractive index over time between the flowing liquid in the sample chamber and the stagnant liquid in the reference chamber is calculated and produced as detector output to be recorded. This difference in refractive index increases continuously as the refractive index of the fluid flowing only through the sample chamber changes, since the refractive index of the fluid in the reference chamber is fixed. This translates in an increasing deflection angle and so an increasing displacement required for the moving platform.

Alternatively, the reference chamber 332 of the cell can be connected in series with a flowing liquid, as depicted in the refractometer 400 of FIG. 4D. To that end, the reference chamber comprises inlet 412 and outlet 414 ports for receiving the flowing reference liquid 410. The dashed arrows indicate the direction of flow. When a mobile phase 408 of time-varying composition, produced continuously by mixing of two or more different solvents (first solvent 402, second solvent 404), is pumped though the system (by the action of a pump 406), it reaches first the reference chamber 332 (i.e. the reference liquid 410 of the reference chamber 332 is the mobile phase 408 used in liquid chromatography); then, after some delay time due to the volume in an injector 420, system tubing and column 430 (one or several, if any), the sample liquid 440, containing a mobile phase (408) mix of solvents (402, 404) and eventually a solute from the injector 420, reaches the sample chamber 334 of the measuring cell 330. The sample chamber 334 comprises inlet 416 and outlet 418 ports through which the sample liquid 440 flows.

Due to the volume delay between reference and sample chambers, the mobile phase composition in the reference liquid and sample liquid is different, and so there is a difference in refractive index between the liquid of the two chambers due to the mobile phase composition change over time. In addition, when a solute loaded into the injection loop (425) by some means (not shown) is injected into the mobile phase stream by the injector (420), traverses the column (430) if any, and enters the sample chamber (334) in the flow cell of the refractometer, there is an additional difference in refractive index between the liquids in the two chambers due to that solute. This additional difference is not constant over time but is only present while the solute traverses the sample chamber, and typically is very small compared to the difference due to the different composition in mobile phase. In this configuration, the refractive index of the fluids within each of the two cell chambers (332, 334) is not fixed but time-varying according to the time-variations of the pumped mobile phase 408. The difference in refractive index does not increase continuously as in the case of a stagnant reference cell, but it remains limited within a certain interval. The width of that refractive index interval is defined by the volume delay between both chambers, flow rate through the system and rate of change of composition in the mobile phase, as well as on the difference in refractive index of the components of the mixture.

In particular, when a linear solvent gradient is applied, the difference in refractive index between the two chambers of the cell would remain approximately constant. Using the configuration of FIG. 4D the difference in refractive index between the two chambers in the cell is limited and therefore the angular deflection and the displacement required for the moving platform is also limited. This may be advantageous to minimize the size of the detector and could be used to enhance the sensitivity or resolution of the detector.

Figure 5:
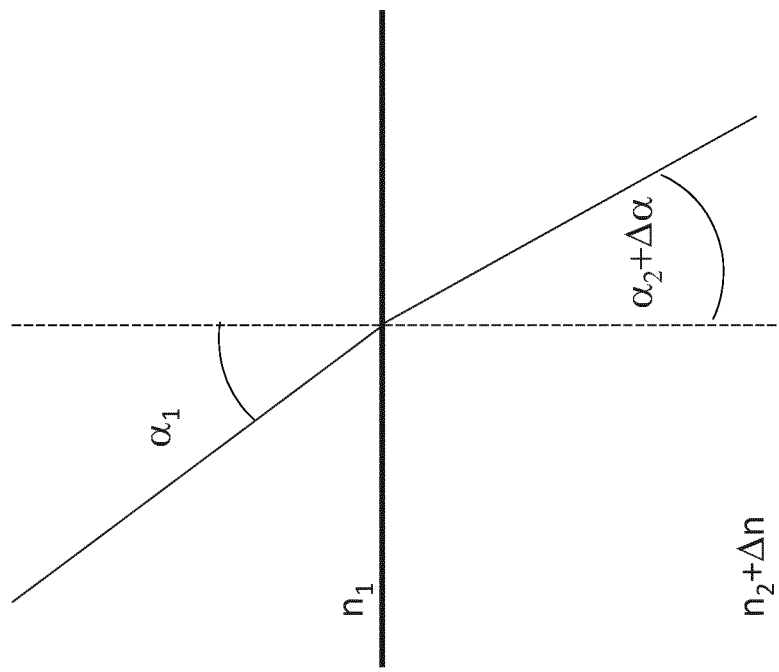
FIG. 5 shows the change in the incidence angle of a beam of light at the interface of two media with different refractive indexes.
Figure 5:
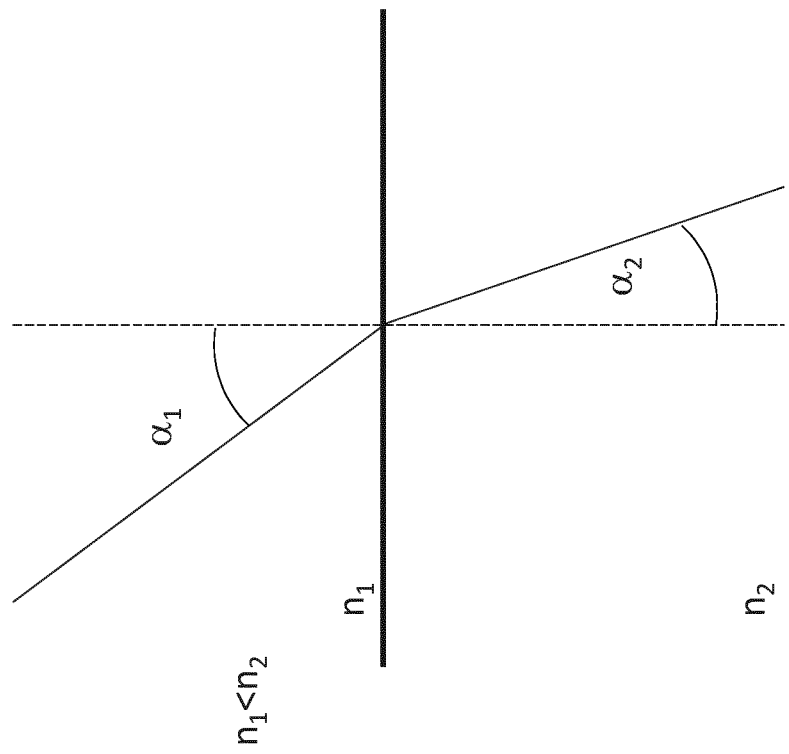

The angle formed by the two faces of the cell, and the incidence angle of the beam of light on the first cell face determine the magnitude of the deflection angle after the cell for a given refractive index of the fluid or fluids in the cell (single or double chamber cell cases), according to the Snell law, applied to each of the interfaces traversed consecutively by the light beam. In particular, the following relation is fulfilled: $\sin \alpha_1 \cdot n_1 = \sin \alpha_2 \cdot n_2$, where $\alpha_1$ and $\alpha_2$ are the angles of incidence at the interface and $n_1$ and $n_2$ are the indices of refraction of the media. In the case of normal incidence, the deflection angle is zero for any refractive index, and the lower the incidence angle (farther from the normal incidence) the larger the deflection due to a change in the refractive index of the fluid in the cell. In FIG. 5, given $n_1$ and $n_2$ the refractive indexes of the two media, for an incidence angle $\alpha_1$, the angle of the deflected beam is $\alpha_2$. When the refractive index of the second medium changes to $n_2+\Delta n$, the angle of the deflected angle changes to $\alpha_2+\Delta\alpha$. For a given change in refractive index $\Delta n$, the change in deflection angle $\Delta\alpha$ is larger when $\alpha_1$, as defined in FIG. 5), is larger.

When going from a medium of larger refractive index to a medium of lower refractive index, the incidence angle cannot be lower than the critical angle at which no refracted light is transmitted. When varying the incidence angle and/or the angle formed by the two faces of the measuring cell, the change in deflection angle for a change in refractive index can be increased, or maximized, thus increasing the sensitivity of the detector to refractive index changes. Since the refractometer of the present invention is able to measure a larger range of deflection angles than refractometers of the prior art, maximizing the deflection angle beyond the limit imposed by the physical dimensions of the split diode is possible and desirable. Therefore, the incidence angle of the beam of light can be optimized to maximize the deflection within the available measurement range, in order to maximize the sensitivity.

When the light traverses an interface between two media, and the refractive index of the first one is higher than the refractive index of the second one, there is an incidence angle at which the deflection angle calculated according to Snell's law is 90°. This is called the critical incidence angle or critical angle and beyond that critical angle there is no refracted light but only total reflection. An incidence angle close to the critical angle provides the maximum change in deflection angle $\Delta\alpha$, for a given change in refractive index $\Delta n$, so a configuration with an incidence angle close to the critical angle is preferred when enhancing the sensitivity is prioritized over extending the range in refractive index units, so that the deflection angle variation due to refractive index variation is maximized.

Figure 6A:
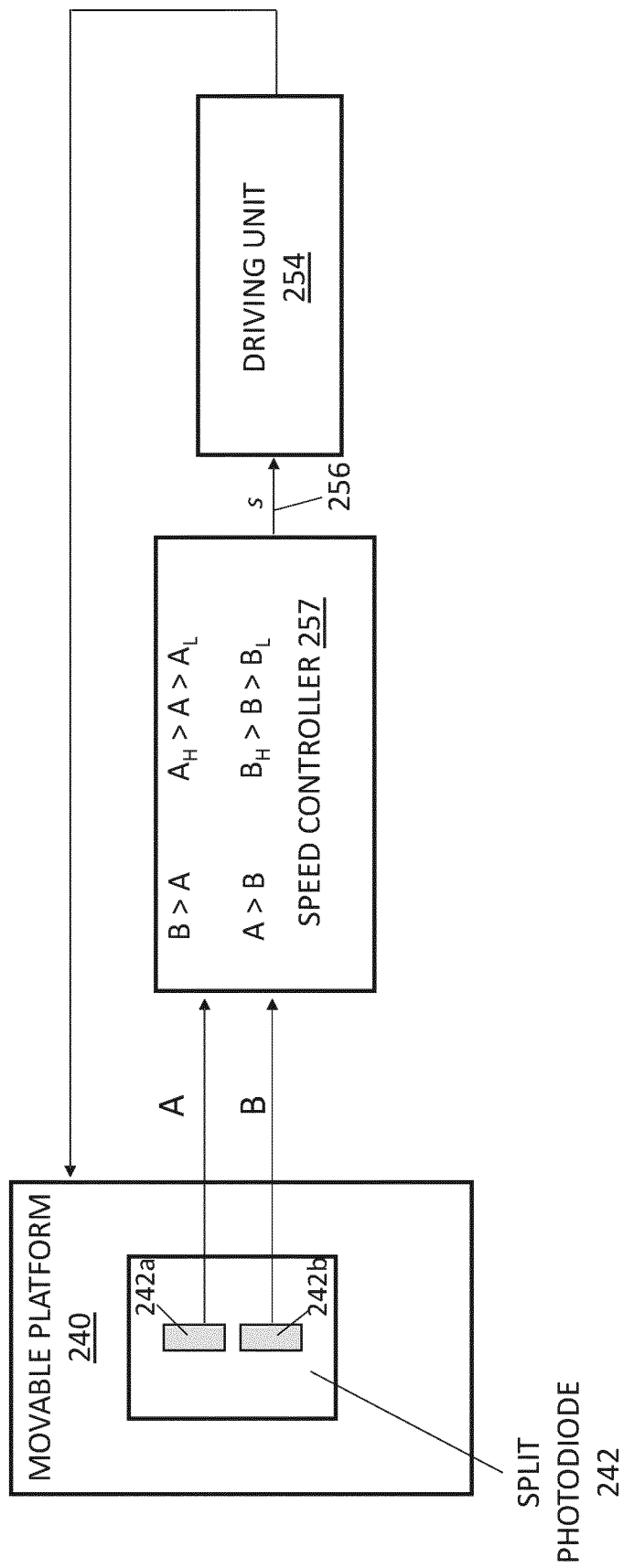
FIGS. 6A, 6B and 6C depict three embodiments of the controller used by the refractometer.

In an embodiment, the platform is moved by the driving unit 254 such that the deflected beam remains within the physical limits of the split photodiode 242. An embodiment for a controller which can operate as described is depicted in FIG. 6A. This controller is a speed controller 257 that monitors the individual signals of the photodiodes A and B in order to move the platform so that the beam image does not move beyond the physical limits of the split photodiode. The total deflection of the beam (from which the refractive index of the fluid is calculated) is obtained from the known position of the moving platform and the difference between the signals of the two photodiodes. In one non-limiting implementation, the controller is programmed to decide the direction of movement depending on which photodiode generates a larger signal: when the image of the deflected beam of light moves in the direction of one of the photodiodes it covers a larger area of the same, and therefore the signal of that particular photodiode increases while the opposite is true for the other photodiode. In order to follow the direction of movement of the deflected beam, the platform needs to be moved in that same direction, indicated by the photodiode with larger signal. The movement only starts when the signal of the lower signal photodiode decreases under a preset level. The movement starts at an initial speed. If the signal goes over that preset level the movement stops again. The speed is increased if the signal decreases further and falls under a second predefined level. Every time the movement stops, the speed is reset to its initial value. The purpose of the outline controller is to track the movement of the beam only to prevent it moves out of the split photodiode, so that the relative position of the beam to the split photodiode position can be measured accurately overtime. That relative position together with the known position of the platform are used to compute the total deflection of the beam and the refractive index of the fluid in the sample chamber.

Figure 6B:
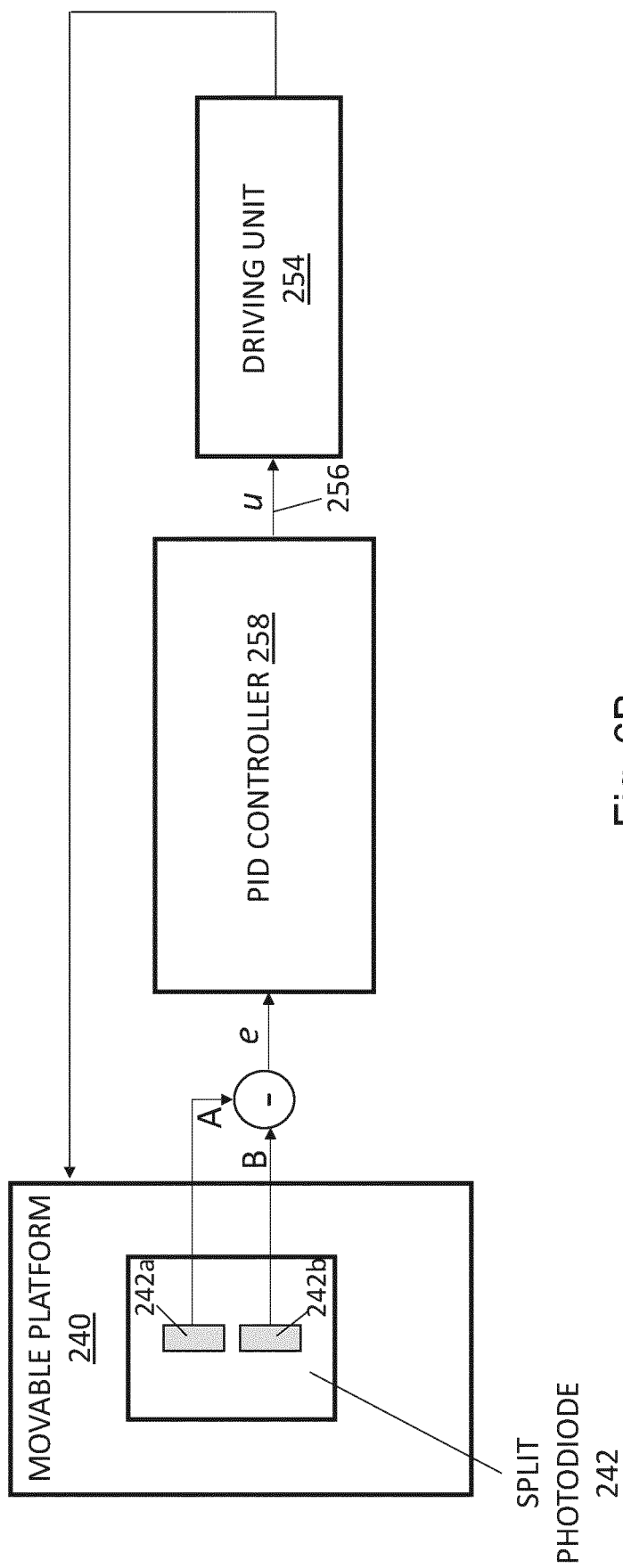

In a preferred embodiment, the platform is moved by the driving unit 254 such that the deflected beam of light 204 is continuously centered at the split photodiode 242 (i.e. the center of the split photodiode 242 is continuously tracking the deflected beam of light 204). Therefore, the control unit 250 acts as a beam tracking digital servo-controller. To that end, the processing unit 252 of the control unit 250 may comprise a PID controller 258 (as depicted in the embodiment of FIG. 3) for continuously controlling the position of the platform so that the deflected beam of light 204 is centered at the split photodiode 242. FIG. 6B depicts an embodiment of the PID controller 258 in which the input error signal (e) of the PID controller 258 is the difference between the output signals (A, B) of both individual photodiodes (242a, 242b). The error signal (e) may be a proportional signal of said difference (A–B), for instance the normalized difference defined as A–B/A+B. The output (u) of the PID controller 258 is the displacement of the platform 240 required to cancel out the error signal (e). The output (u) corresponds to the activation instruction 256 sent to the driving unit 254, which in turn, from its current position, moves up or down the movable platform a magnitude according to said activation instruction 256.

The error signal required for the PID controller operation may also be implemented from the outputs of alternative position sensing, such as a lateral effect photodiode or a sensor array. The output of such alternative devices could be either analog or digital but still proportional to the distance of the beam position to the center of the detector, with opposite sign depending on the direction of the unbalance.

Figure 6C:
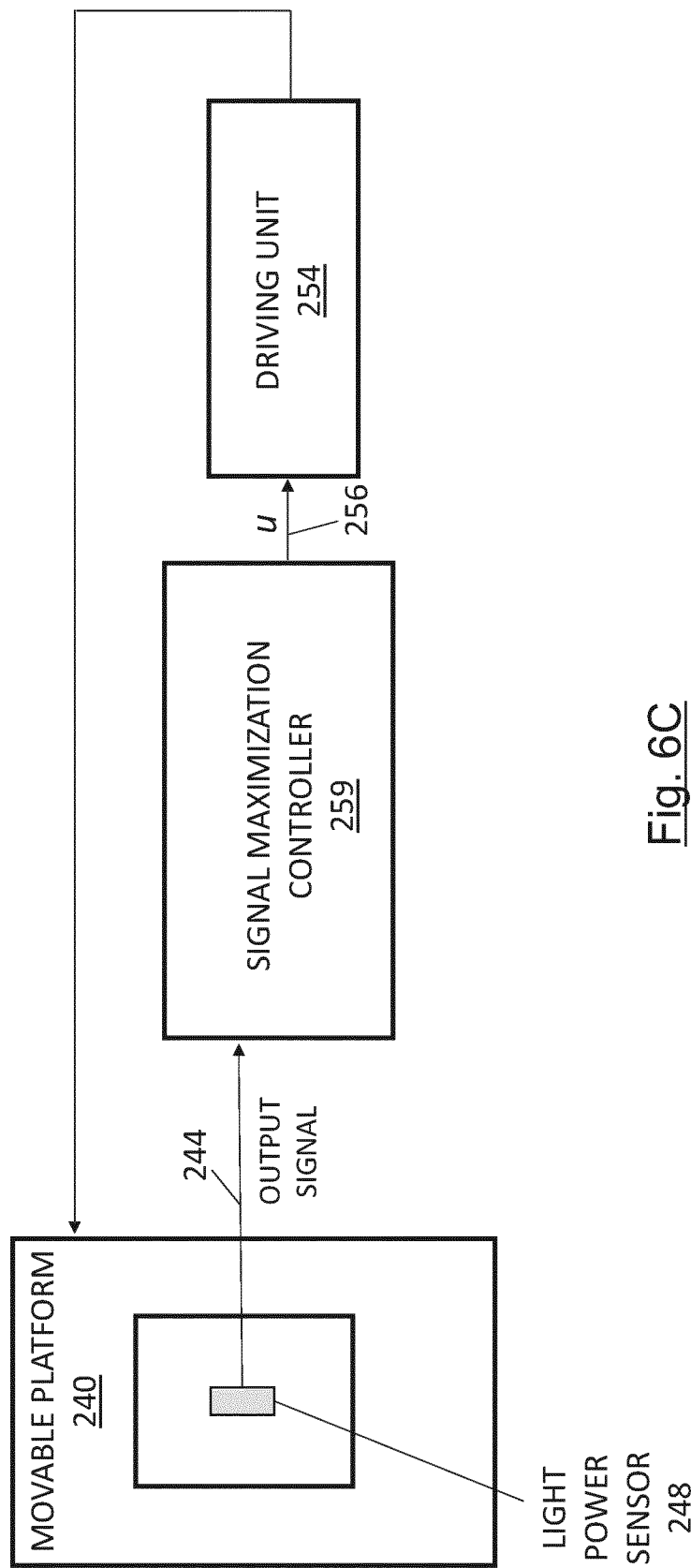

In another embodiment depicted in FIG. 6C, the platform 240 is moved by the driving unit 254 such that the deflected beam position is tracked by means of a light power sensor 248 whose output signal 244 is maximum when said light power sensor 248 is perfectly aligned with the beam. A signal maximization controller 259 is used to calculate the magnitude and sense (positive or negative) of the movement required for such perfect tracking based on the current and past values of the light power sensor output signal 244 and the previous and current positions of the platform. The output (u) of this signal maximization controller 259 corresponds to the activation instruction 256 sent to the driving unit 254, which in turn, from its current position, moves up or down the movable platform 240 a magnitude according to said activation instruction 256. In this embodiment the light beam deflection is obtained by the position of the platform 240.

The refractometer of the present invention is preferably applied in liquid chromatography or related techniques, using either an isocratic or a gradient elution. The measuring cell is a flow cell, and the sample chamber 234 comprises inlet and outlet ports for receiving a flowing sample liquid coming from the column chromatography. In the embodiment of FIG. 3, the measuring cell 330 may be a flow cell of the type used in liquid chromatography, wherein both the sample chamber 334 and the reference chamber 332 comprises inlet and outlet ports for receiving a flowing sample liquid (solvent plus solute coming from the column chromatography) and a reference liquid (pure solvent), respectively.

In an embodiment, the movable platform 240 is driven by a high-resolution motor stage able to perform and monitor movements in nanometer scale (for instance a piezo motor stage). This very high resolution allows determination of very small differences in refractive index which is required for accurate quantification of concentration of solutes in liquid chromatography or any other application demanding such a large measurement range in the refractive index.

The combination of large movement range and high resolution provides a new approach to measure refraction index and allows the use of the new detector in applications such as gradient liquid chromatography, in which conventional refractometers cannot be used. According to a preferred embodiment used in liquid chromatography, a servo-control (control unit 250) adjusts the motor position (driving unit 254) so that the deflected light beam is always centered at the split diode, generating a zero output. In an embodiment, a proportional derivative integral (PID) algorithm is implemented by the data processing unit 252 of the control unit 250 to allow the system continuously track the position of the beam with high accuracy. The PID controller 258 takes as input the split diode signal, which is zero when the beam is centered on it, and positive or negative depending on the position of the beam respect to the split diode center.

The PID controller 258 is optimized by measuring the dynamic response of the system by proper controlled experiments. One of such experiments involves a step movement of the motor and monitoring of the response of the split diode as a function of time. From this experiment, the dynamic characteristics of the system can be extracted for calculation of the optimized controller (i.e. values of P, I, D coefficients). Alternative controllers which can be optimized to the dynamic behavior of the system can of course be used as well. If the controller is not properly optimized the system may become unstable and the motor oscillate around the actual position of the beam, or become unable to follow accurately fast changes in position. When there is a real change in refractive index due to the presence of a solute (a peak in the liquid chromatography experiment) the optimized PID controller 258 allows accurate tracking of the peak, without overshooting or smoothing.

As previously explained in FIGS. 2A and 2B, it is also possible to use a flow cell (i.e. measuring cell) with a single chamber, without the reference chamber. One of the purposes of the reference chamber of the flow cells in conventional refractometers is forcing the beam of light to a fixed zero position by filling the two chambers with same pure solvent. This is necessary due to the limited range in displacement which can be detected. In the refractometer of the present invention the range is large enough so that it is not necessary to bring the beam to the same "zero" position by optical means or by using a double chamber cell. Moreover, the absolute position of the motor when the single cell is filled with a given solvent allows to calculate the absolute refractive index of that solvent, at the cell temperature and wavelength of the light used to generate the beam. This way the detector can be considered an absolute refractive index detector.

Figure 7A:
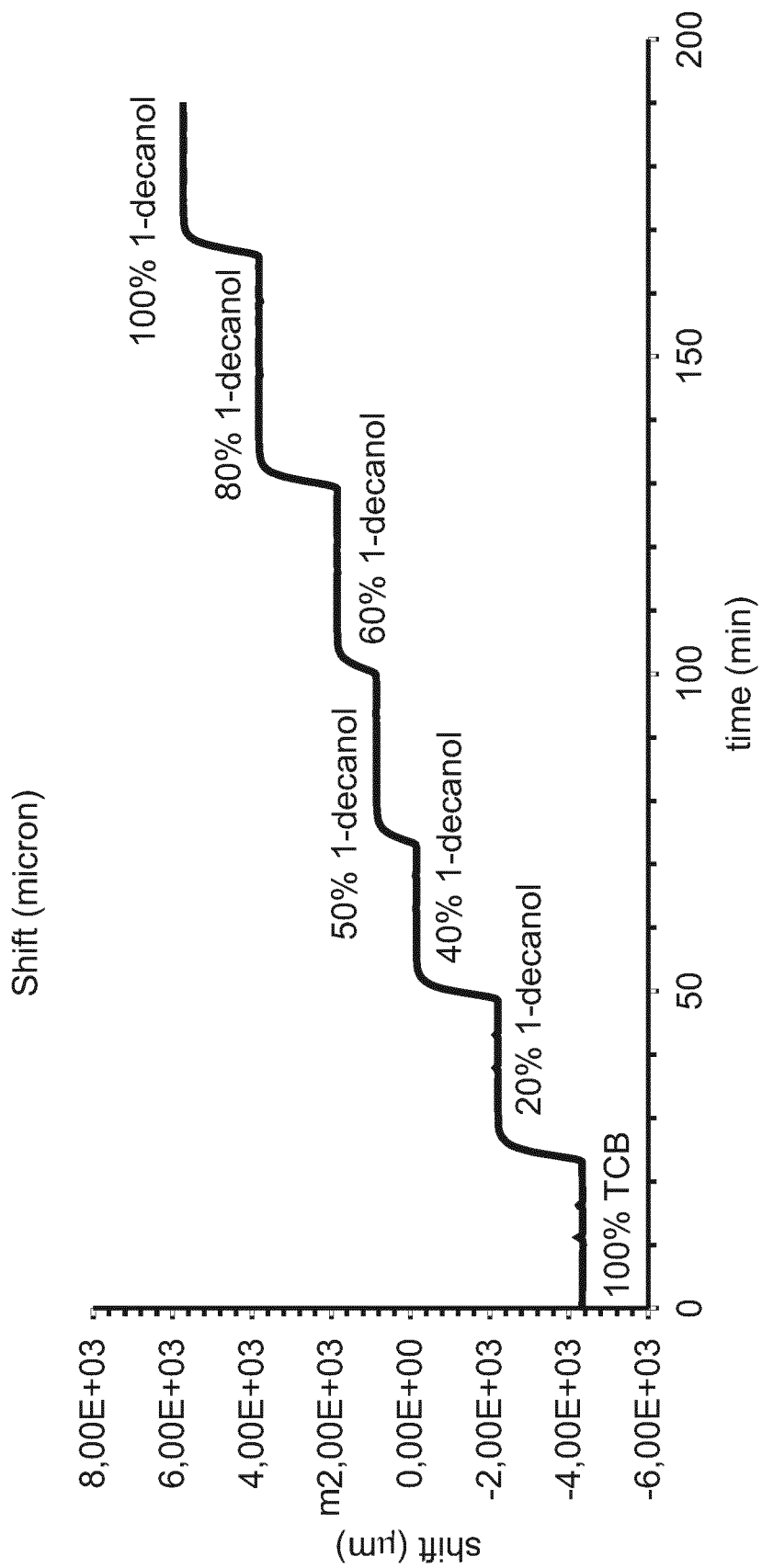
FIGS. 7A and 7B show data from the refractometer of the present invention used with 1,2,4-trichlorobenzene (TCB), 1-decanol and mixtures thereof as mobile phase.
Figure 7B:
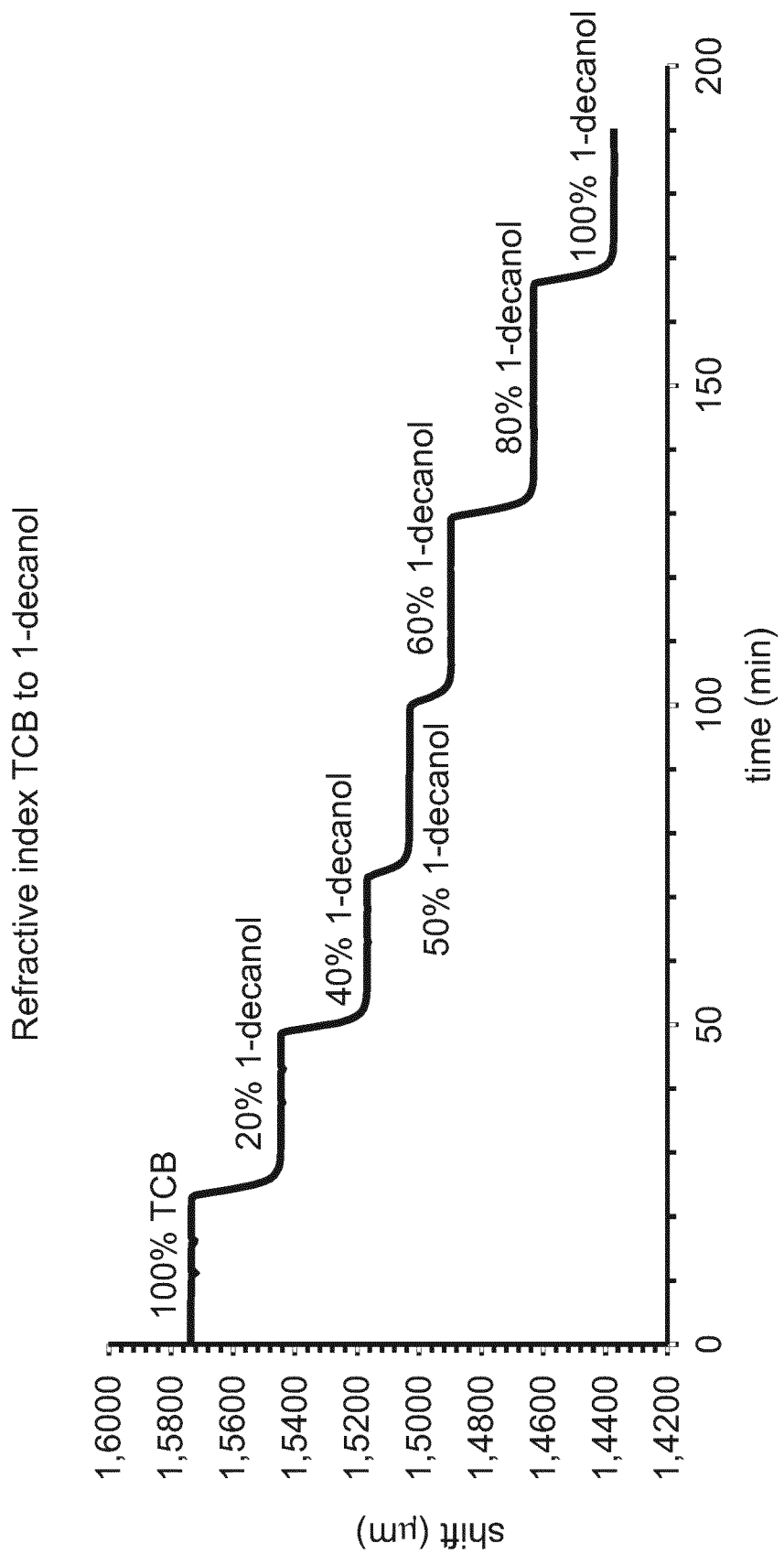

In order to demonstrate the much broader range of the present invention compared to the prior art, which is large enough to cover practical applications of gradient liquid chromatography, a system described in literature is chosen as a test system. According to the paper "*Separation of short-chain branched polyolefins by high-temperature gradient adsorption liquid chromatography*", Macko et. al Anal Bioanal Chem. 2011 February; 399(4):1547-56, the system 1-decanol/1,2,4-trichlorobenzene (TCB) can be used in gradient liquid chromatography mode for the separation of polyolefins depending on their chemical composition. In FIGS. 7A and 7B data from the refractometer of the present invention is presented when TCB, 1-decanol and mixtures thereof in different proportions covering the full range is flown through the measuring cell 230 as mobile phase at constant flow rate of 0.5 mL/min. The refractive index of TCB and 1-decanol can be taken as 1.572 and 1.436, so the total change in refractive index is 0.136 RIU, larger by orders of magnitude of what previous deflection-type detectors can measure. In the figures it is clear how the signal from the detector in units of shift (displacement of the platform in microns, urn) follows accurately, without saturation, the full range in composition of mobile phase as it is changed from TCB to 1-decanol in steps or 20% or 10%.

Figure 8:
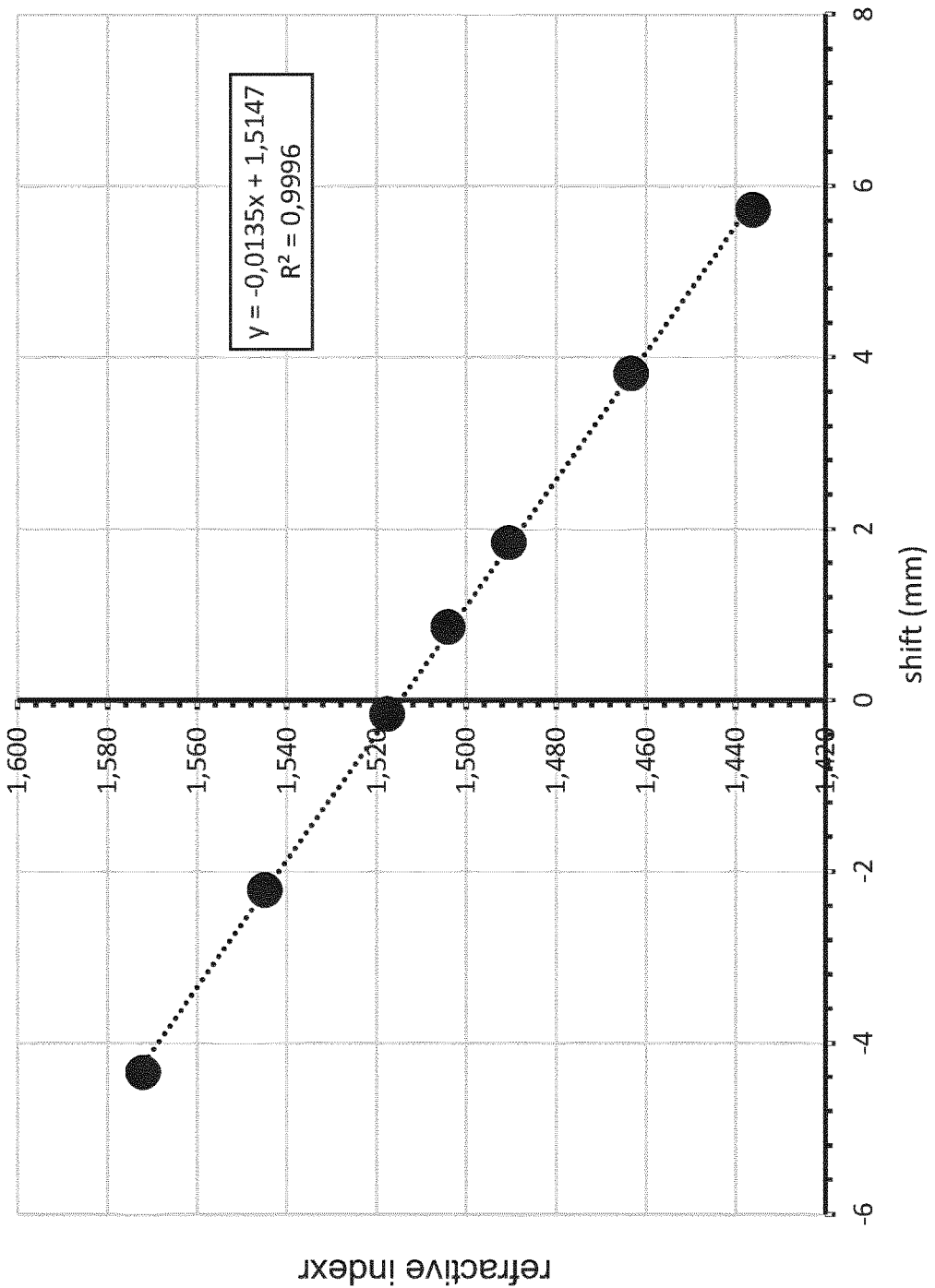
FIG. 8 is a graph showing the measured shift vs refractive index of the mobile phase for the experiment of FIGS. 7A and 7B.

From the data in FIG. 7A and knowledge of refractive index of TCB and 1-decanol, and assuming that the refractive index of mixtures of the same is proportional to the volume fraction of the components, a series of data points, measured shift vs refractive index of the mobile phase, can be plotted, as depicted in FIG. 8. From the graph it is apparent that the measured shift and refractive index is almost linear.

Figure 9A:
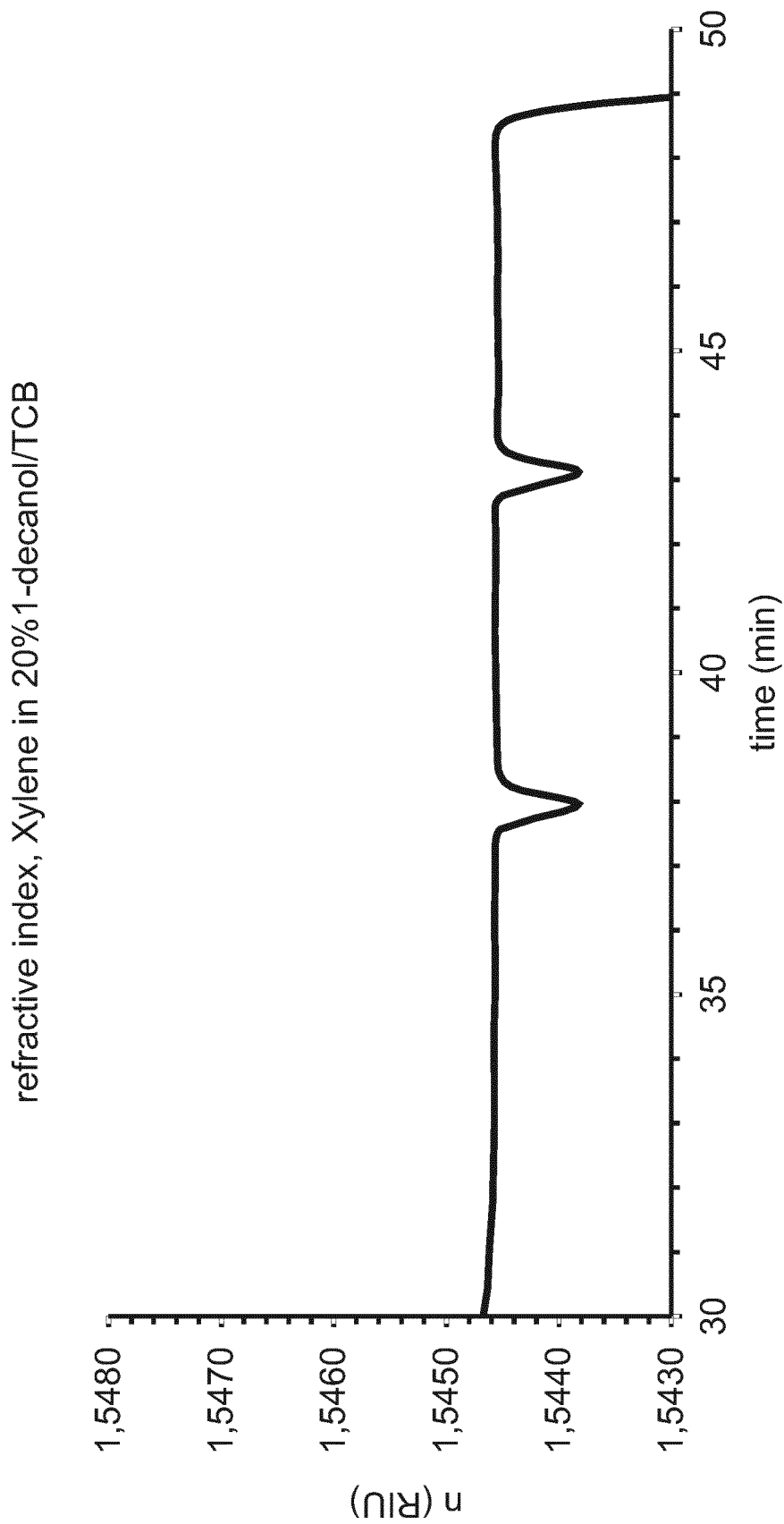
FIGS. 9A and 9B shows the refractive index recorded continuously along the time scale from injections of a small amount of xylene in a mixture of different proportions of 1-decanol and TCB.
Figure 9B:
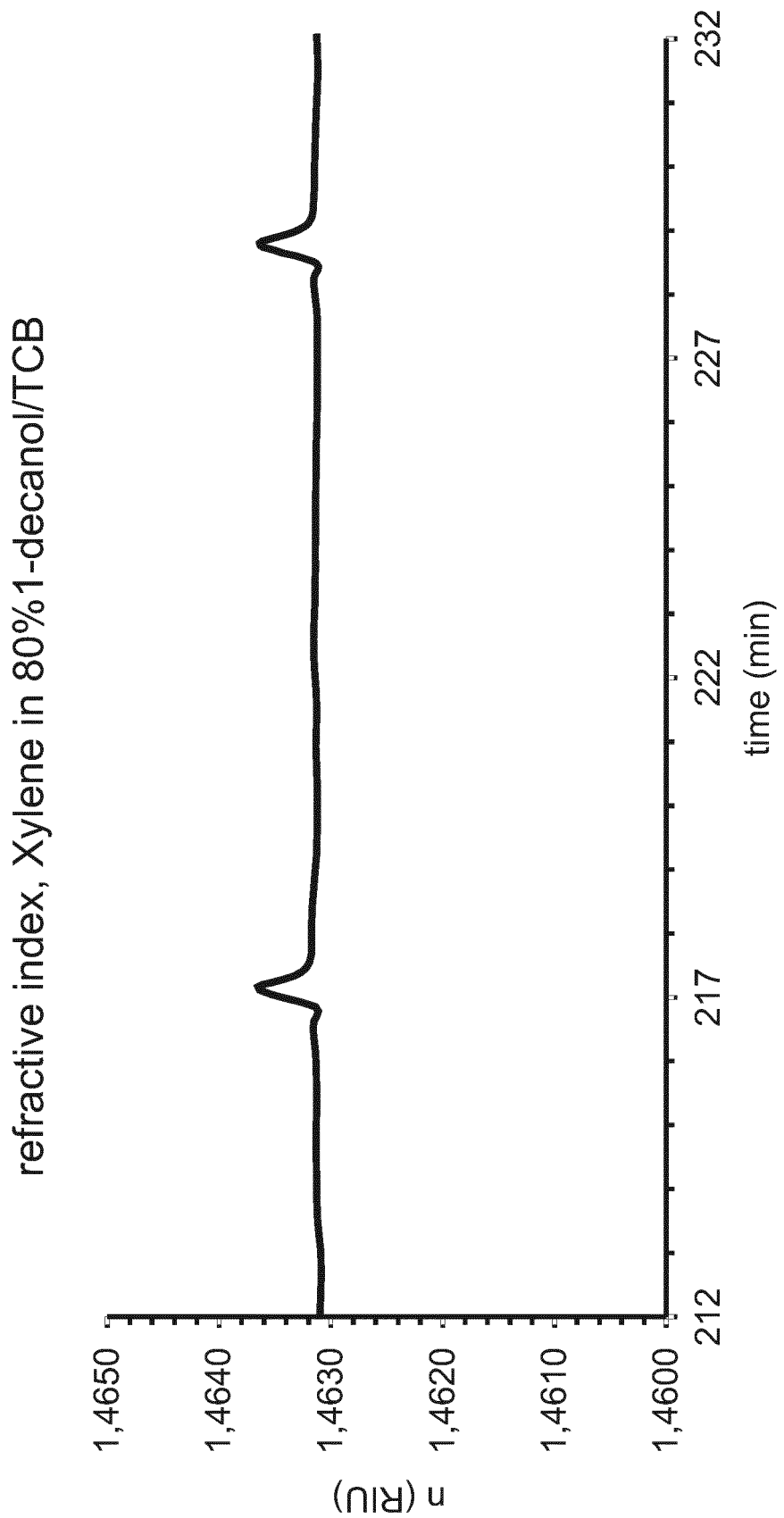

The system was also tested by injecting a small amount (5 µL) of xylene which has a refractive index of 1.501, an intermediate value between those of 1-decanol and of TCB into a continuous stream of mobile phase flowing through the detector cell. Injections were made when a mixture rich in TCB (FIG. 9A) or rich in 1-decanol (FIG. 9B) were used as mobile phase. The mobile phase composition determines the baseline refractive index, that is, the constant level in the detector output when the mobile phase flows through the cell. When the test sample with a different refractive index enters the cell, the detector output changes to track the refractive index change, generating a peak in the detector output as seen in FIGS. 9A and 9B. When the refractive index of the test sample is lower than the baseline refractive index (1.501 for xylene compared to 1.544 of the TCB rich mobile phase), a negative peak is generated (FIG. 9A), while when the refractive index of the test sample is higher than the baseline level the resulting peak is positive, as in FIG. 9B (1.501 for xylene compared to 1.463 of the TCB rich mobile phase). Therefore, the background refractive index was over or below that of the injected sample, causing the sample peak to be negative or positive over the baseline.

Figure 10:
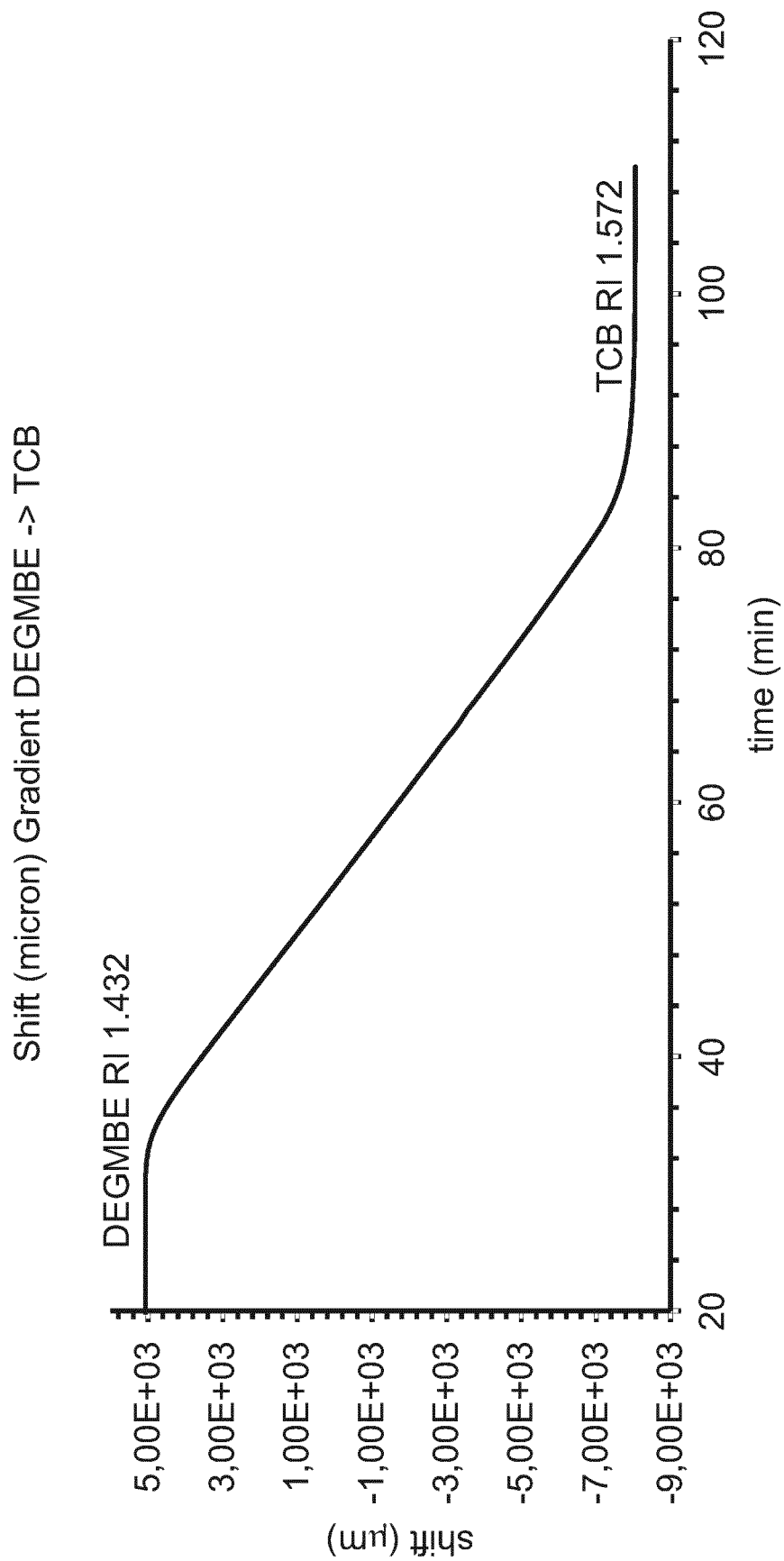
FIG. 10 shows the shift (deflection of the light beam) for a gradient Di-ethylene-glycol-mono-butyl ether (DE-GMBE)-TCB.

In addition to the isocratic experiments using different mobile phase compositions depicted in FIGS. 7A and 7B, the operation in a continuous gradient of mobile phase compositional change is demonstrated in FIG. 10 (linear gradient Di-ethylene-glycol-mono-butyl ether (DEGMBE)-TCB).

Figure 11A:
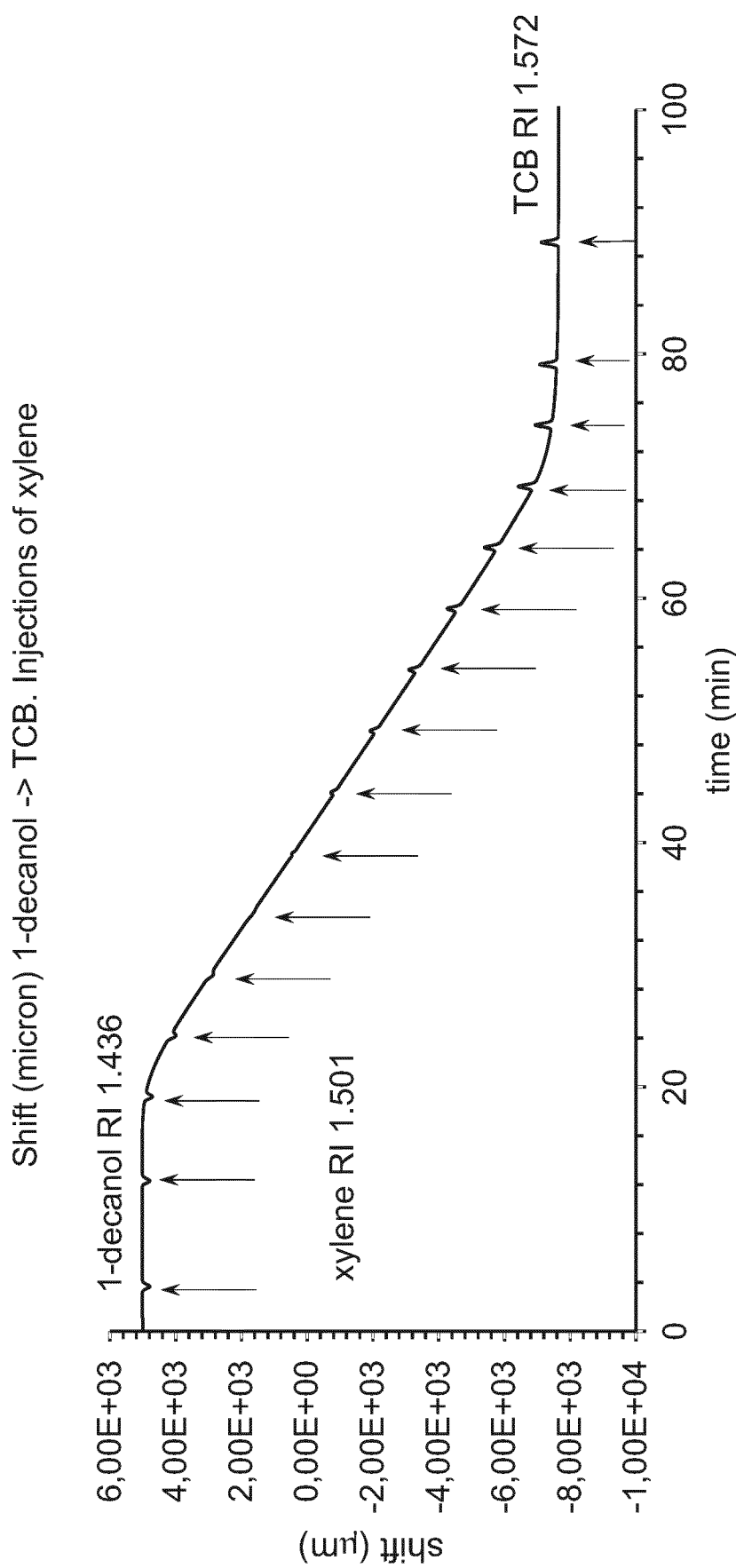
FIG. 11A shows the shift for repeated injections of xylene along a continuous gradient 1-decanol-TCB.
Figure 11B:
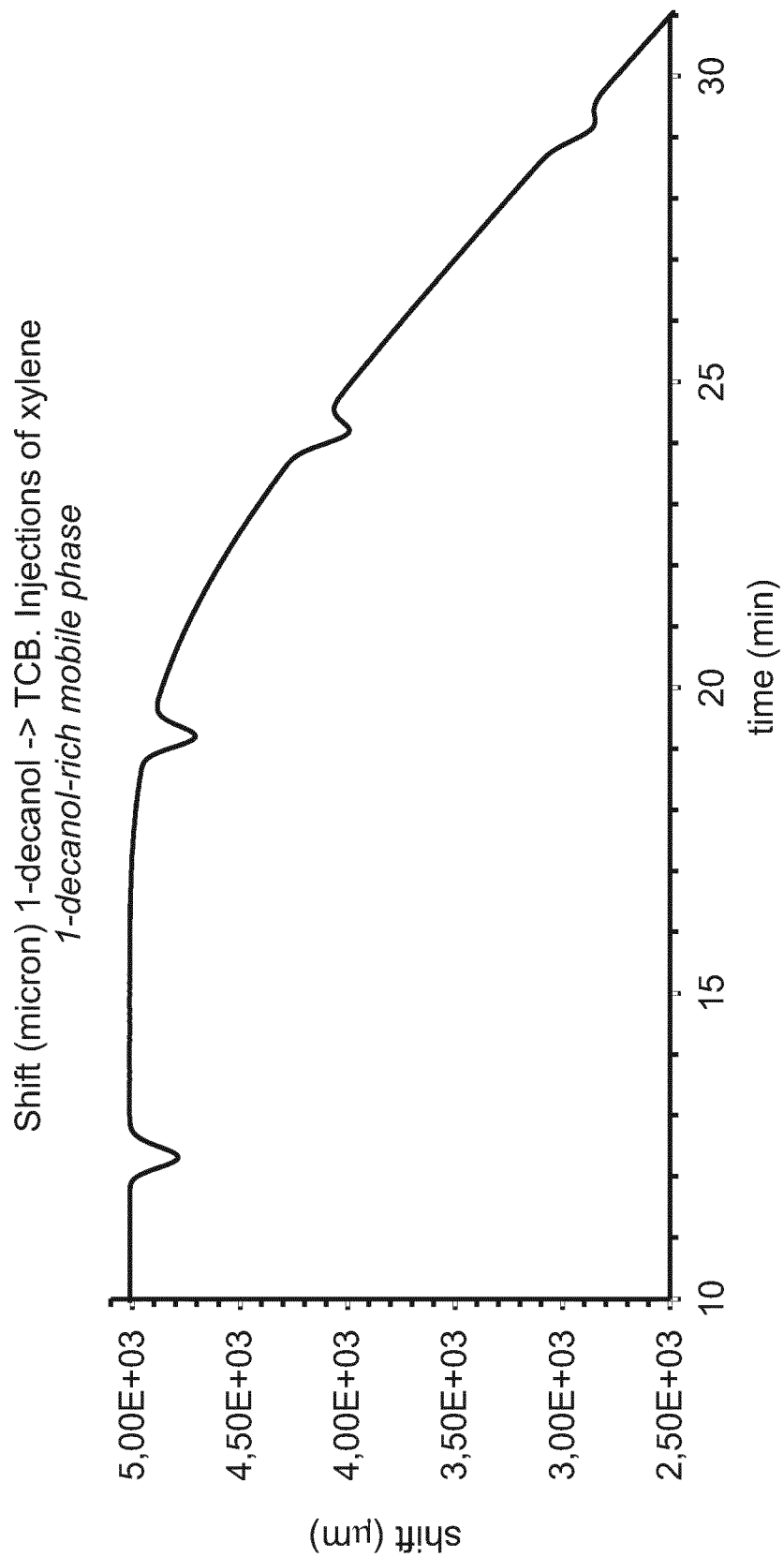
FIGS. 11B and 11C show an enlarged view of the same data during the first part and the last part of the gradient, respectively.
Figure 11C:
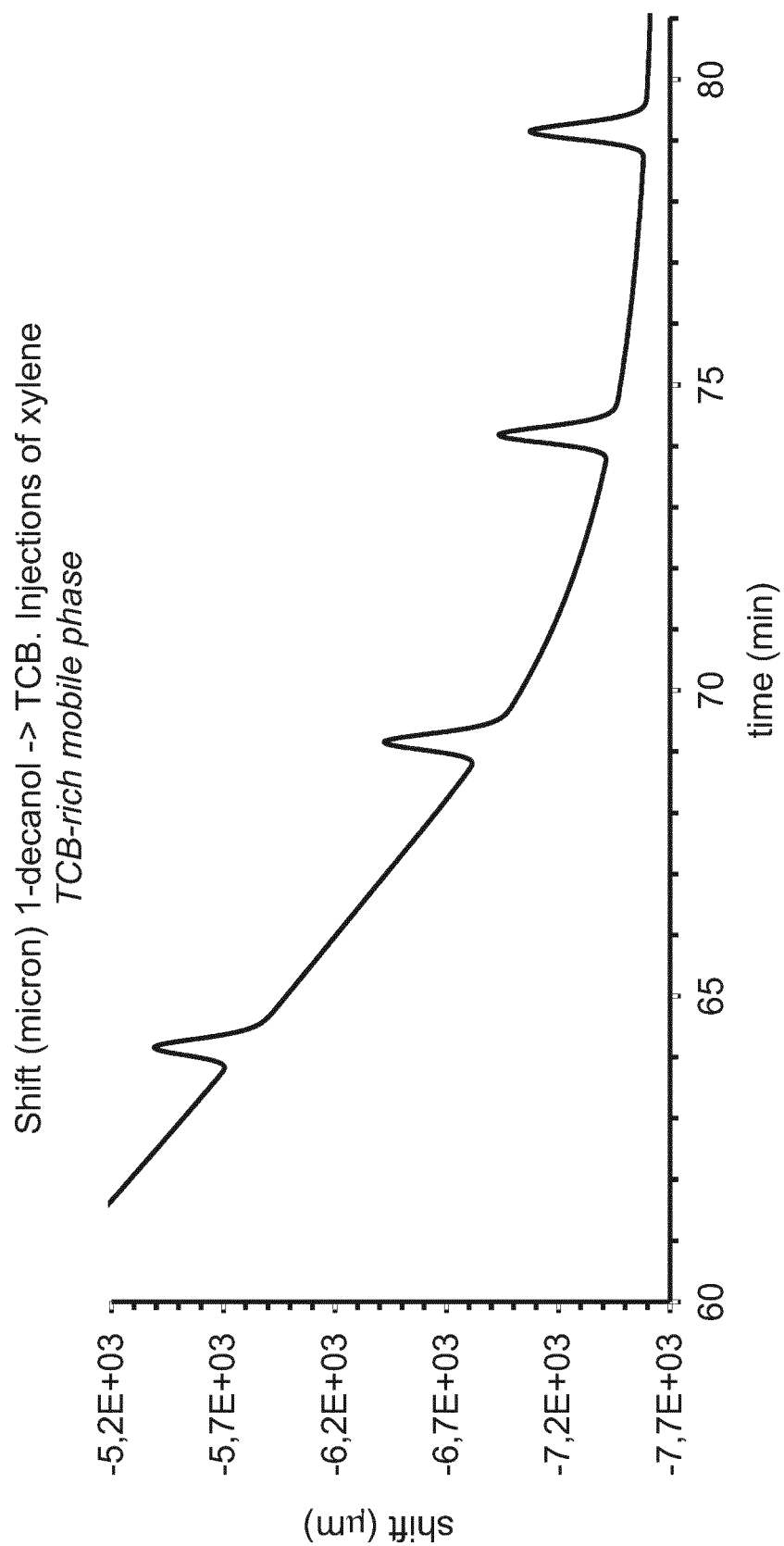

FIGS. 11A, 11B and 11C show the operation of the detector when a test sample (5 microliter xylene) is injected multiple times along a continuous linear gradient 1-decanol-TCB flowing though the detector cell at a constant flow rate of 0.25 mL/min. Given the refractive index of xylene has an intermediate value between 1-decanol and TCB, the peaks during the first part of the analysis are negative (enlarged view in FIG. 11B) while the observed peaks during the last part of the gradient, are positive (FIG. 11C).

Figure 12A:
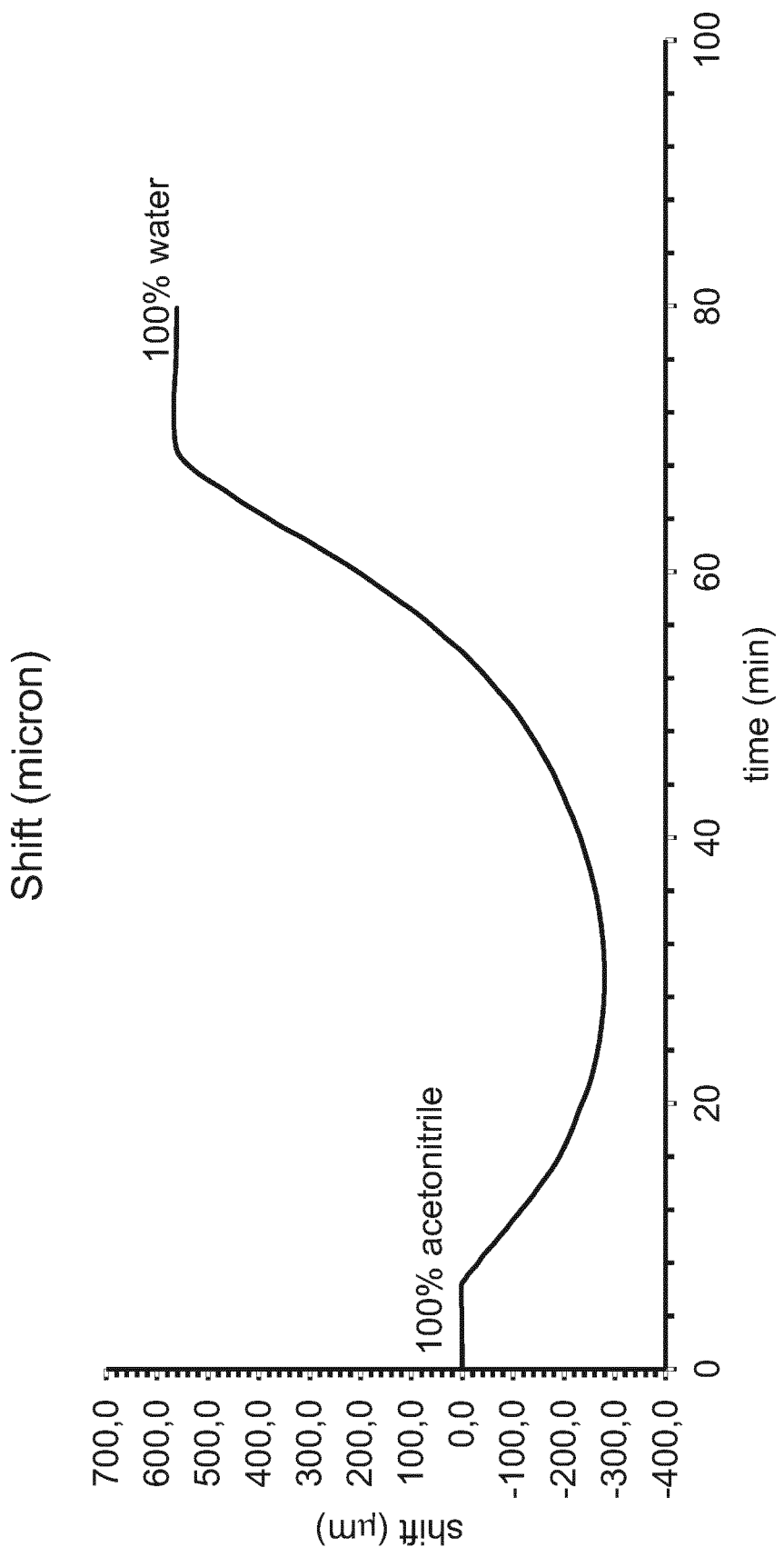
FIGS. 12A and 12B respectively depicts the recorded shift and the calculated refractive index during a continuous linear gradient of acetonitrile to water.
Figure 12B:
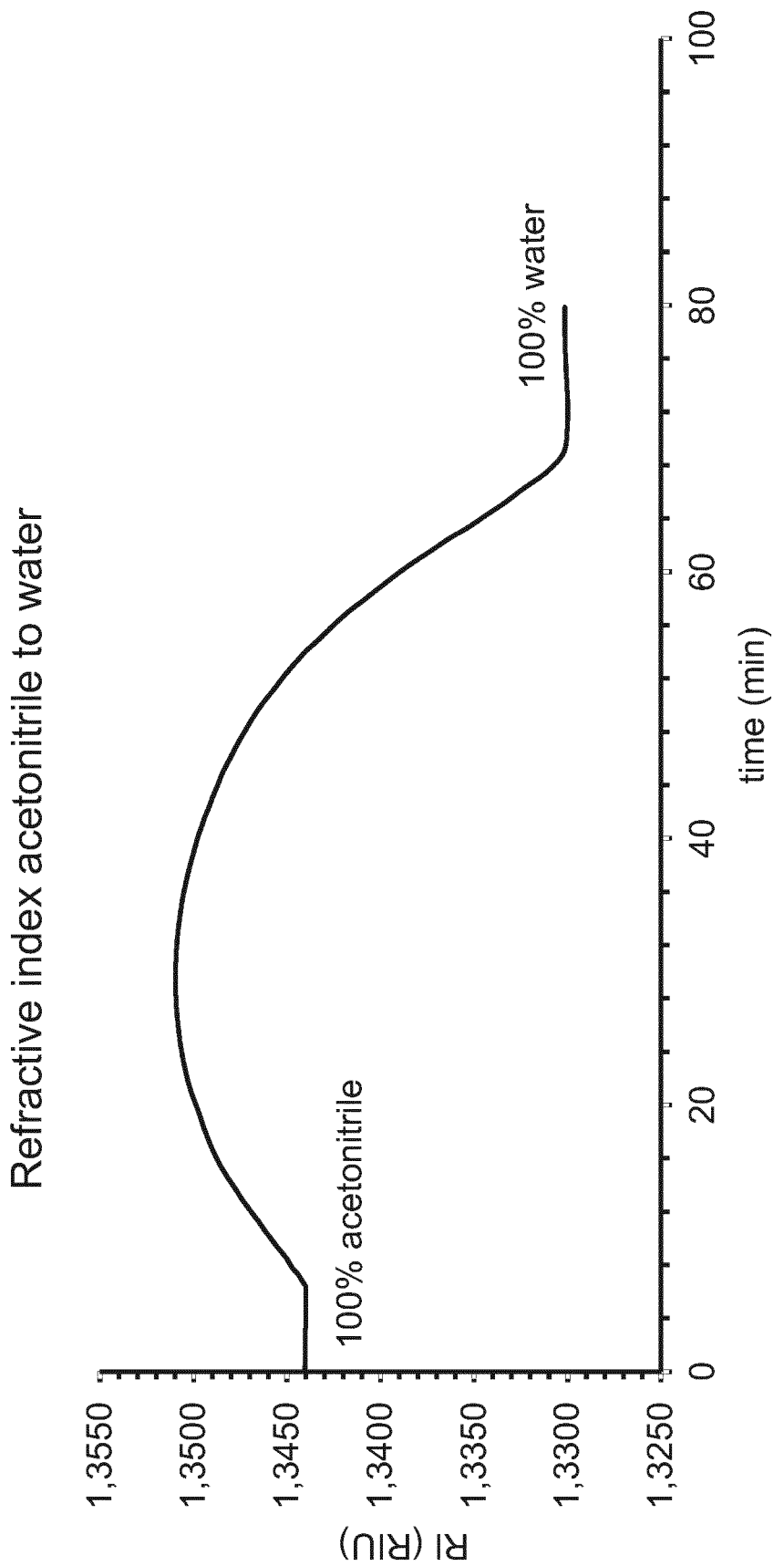

Even if the data in FIG. 8 show an almost perfect linearity, the refractive index of the mixture of two solvents does not necessarily follow a linear trend with the volume fraction of each of the components. A very clear example of this behavior is another system tested with the same refractometer: a gradient of acetonitrile to water in 60 minutes at a flow rate of a 0.3 mL/min with 10 minutes wait at the end was performed and data of observed shift (deflection of the light beam image after traversing the cell) is presented in FIG. 12A, and calculated refractive index in FIG. 12B. For this system the refractive index not only does not change linearly with the proportion of water, but it inverts the direction of variation, resulting in intermediate compositions with lower refractive index than any of the two components.

The invention claimed is:

1. A deflection-type refractometer with extended measurement range for obtaining a refractive index measure of a flowing sample liquid, comprising:
    means for generating a beam of light, said means comprising a light source;
    a measuring cell comprising a sample chamber with inlet and outlet ports for receiving a flowing sample liquid, the measuring cell arranged such that the beam of light from the light source impinges on the sample chamber and is deflected after traversing two non-parallel faces of the sample chamber;
    an optical sensor mounted on a movable platform for detecting the deflected beam of light, wherein the optical sensor is a position sensing detector configured to output a signal indicating a relative position of the deflected beam of light with respect to the sensing area;
    a driving unit configured to move the platform;
    a distance measurement unit configured to measure the displacement of the platform to obtain a platform position; and
    a control unit comprising a data processing unit configured to:
        continuously calculate the deflection of the beam of light from the platform position combined with the relative position of the deflected beam of light on the optical sensor; and
        obtain a refractive index signal over time of the sample liquid using the calculated deflection.

2. The refractometer of claim 1, wherein the driving unit is configured to move the platform such that the deflected beam of light is centered at the optical sensor.

3. The refractometer of claim 2, wherein the processing unit of the control unit comprises a PID controller for continuously controlling the displacement of the platform.

4. The refractometer of claim 3, wherein the position sensing detector is a split photodiode formed by two individual photodiodes,
    wherein the driving unit is configured to move the platform such that the deflected beam of light is centered at the split photodiode, and
    wherein the error signal (e) of the PID controller is proportional to the difference between both individual photodiode output signals (A, B) and the applied action (u) is the displacement of the platform required to cancel out the error signal (e).

5. The refractometer of claim 1, wherein the driving unit is configured to move the platform according to a predetermined movement pattern.

6. The refractometer of claim 5, wherein the predetermined movement pattern is a continuous movement between two predefined positions at a constant speed or an arbitrary movement at time varying speed.

7. The refractometer of claim 1, wherein the position sensing detector is a split photodiode formed by two individual photodiodes, a lateral effect photodiode or a photodiode array.

8. The refractometer of claim 1, wherein the driving unit is configured to move the platform linearly.

9. The refractometer of claim 1, wherein the measuring cell is a body comprising a single chamber.

10. The refractometer of claim 1, wherein the measuring cell comprises a reference chamber for receiving a reference liquid, the measuring cell being arranged such that the beam of light is deflected after traversing two non-parallel faces of the reference chamber and sequentially traverses both the reference chamber and the sample chamber; and wherein the refractive index signal is the difference in refraction indexes ($\Delta n$) between sample and reference liquids.

11. A gradient liquid chromatography system, comprising:
    the refractometer according to claim 10;

a pump for pumping a mobile phase comprising a mix of two or more solvents into the reference chamber of the refractometer;

a chromatography column, the output of which is connected to the sample chamber of the refractometer; and an injector for dosing a solute into the chromatography column.

12. A method for obtaining a refractive index measure of a flowing sample liquid, comprising:

generating a beam of light;

receiving a sample liquid in a sample chamber of a measuring cell with inlet and outlet ports for receiving a flowing sample liquid, the measuring cell being arranged such that the beam of light impinges on the sample chamber and is deflected after traversing two non-parallel faces of the sample chamber;

moving a platform to detect the deflected beam of light using an optical sensor mounted on the platform, wherein the optical sensor is a position sensing detector configured to output a signal indicating a relative position of the deflected bean of light with respect to the sensing area;

measuring the displacement of the platform to obtain a platform position;

continuously calculating the deflection of the beam of light from the platform position combined with the relative position of the deflected bean of light on the optical sensor; and obtaining a refractive index signal over time of the sample liquid using the calculated deflection.

13. The method of claim 12, wherein the platform is moved such that the deflected beam of light is centered at the optical sensor.

14. The method of claim 13, further comprising continuously controlling the displacement of the platform using a PID controller.

15. A gradient liquid chromatography method, comprising:

pumping a mobile phase comprising a mix of two or more solvents into the reference chamber of a refractometer;

dosing a solute into a chromatography column, the output of which is connected to the sample chamber of the refractometer;

obtaining a refractive index signal over time of the sample liquid according to the method of 37.

* * * * *